(12) United States Patent
Gingo et al.

(10) Patent No.: US 8,822,011 B2
(45) Date of Patent: Sep. 2, 2014

(54) MULTI-LAYER FOAM STRUCTURE

(75) Inventors: Mark Gingo, Beaverton, OR (US); Joe Boyle, Portland, OR (US)

(73) Assignee: Columbia Sportswear North America, Inc., Portland, OR (US)

( * ) Notice: Subject to any disclaimer, the term of this patent is extended or adjusted under 35 U.S.C. 154(b) by 277 days.

(21) Appl. No.: 13/172,677

(22) Filed: Jun. 29, 2011

(65) Prior Publication Data

US 2011/0318529 A1    Dec. 29, 2011

Related U.S. Application Data

(60) Provisional application No. 61/359,801, filed on Jun. 29, 2010.

(51) Int. Cl.
| | | |
|---|---|---|
| *B32B 3/24* | (2006.01) | |
| *B32B 5/18* | (2006.01) | |
| *B32B 5/24* | (2006.01) | |
| *B32B 5/26* | (2006.01) | |
| *B32B 3/26* | (2006.01) | |

(52) U.S. Cl.
CPC . *B32B 5/18* (2013.01); *B32B 3/266* (2013.01); *B32B 5/24* (2013.01); *B32B 5/26* (2013.01)
USPC ........ 428/138; 428/137; 428/140; 428/304.4; 428/217; 156/243

(58) Field of Classification Search
CPC .................................. B32B 5/18; B32B 3/266
USPC ........ 428/137, 138, 140, 217, 304.4; 156/243
See application file for complete search history.

(56) References Cited

U.S. PATENT DOCUMENTS

| | | | | |
|---|---|---|---|---|
| 4,438,574 | A * | 3/1984 | Johnson | 36/45 |
| 4,644,977 | A * | 2/1987 | Arterburn | 138/137 |
| 2006/0226305 | A1* | 10/2006 | Sheybani | 248/118.5 |
| 2009/0274015 | A1* | 11/2009 | Sun et al. | 368/282 |

* cited by examiner

*Primary Examiner* — William P Watkins, III
(74) *Attorney, Agent, or Firm* — Schwabe, Williamson & Wyatt, P.C.

(57) ABSTRACT

Embodiments herein may provide multi-layer structures for straps or utility packs. Embodiments include a multi-layer structure for support elements of a utility pack, such as straps (e.g., backpack straps, duffle bag straps, etc.) and/or panels (e.g., the back panel of a backpack). The multi-layer structure may have improved breathability while still retaining other desired properties, such as resilience, strength, comfort, padding/cushioning, and/or durability. Some embodiments of the multi-layer structure also may be thinner and/or lighter than conventional padded support structures. Various embodiments may provide utility pack straps including a reinforcing layer coupled to at least one of an inner structural layer and an outer structural layer. In some embodiments, the straps may include both the inner structural layer and the outer structural layer. The inner structural layer may contact the body of the user when the strap is in use, and may be designed to provide cushioning to the user. The reinforcing layer may provide strength and/or stability to the strap.

18 Claims, 22 Drawing Sheets

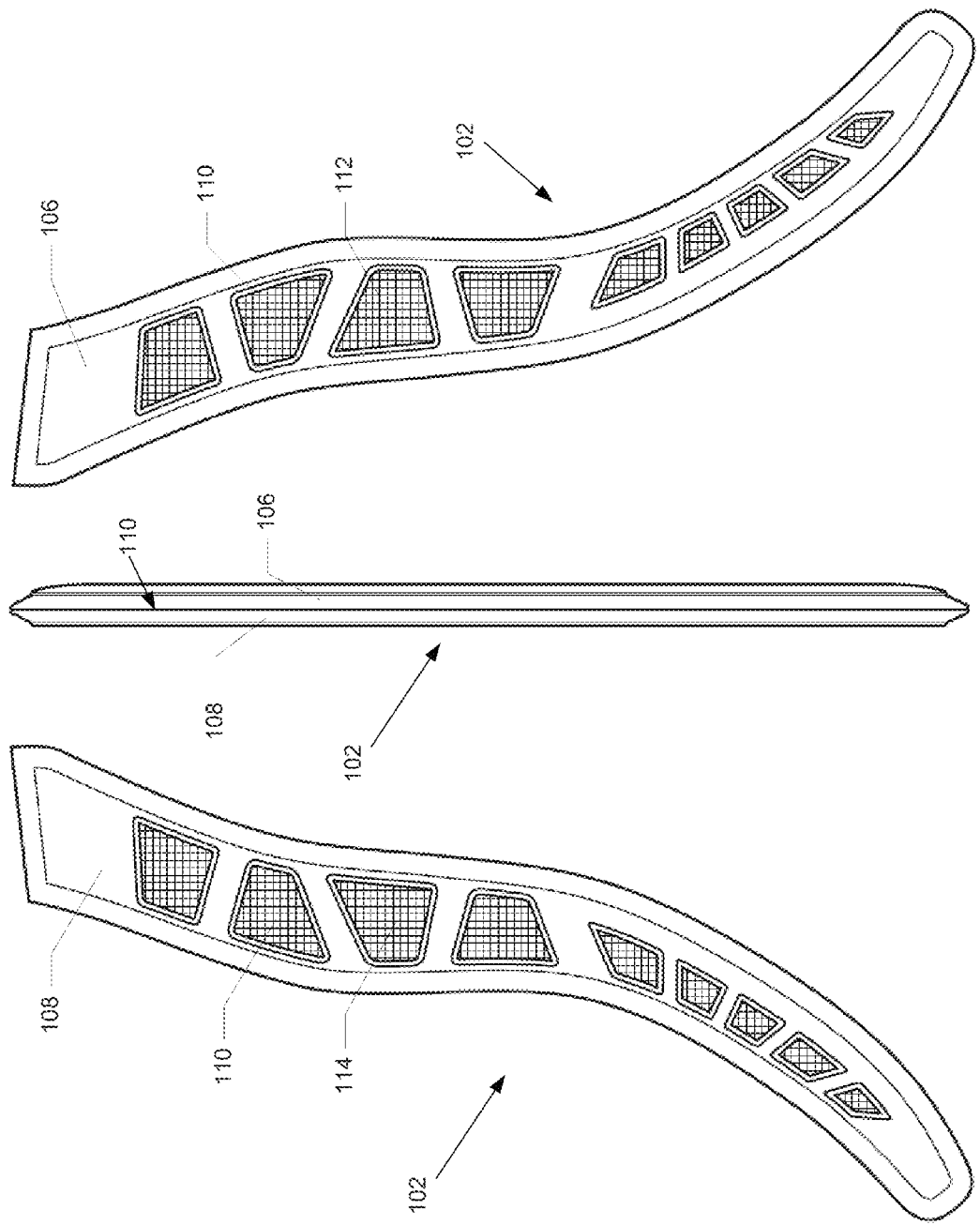

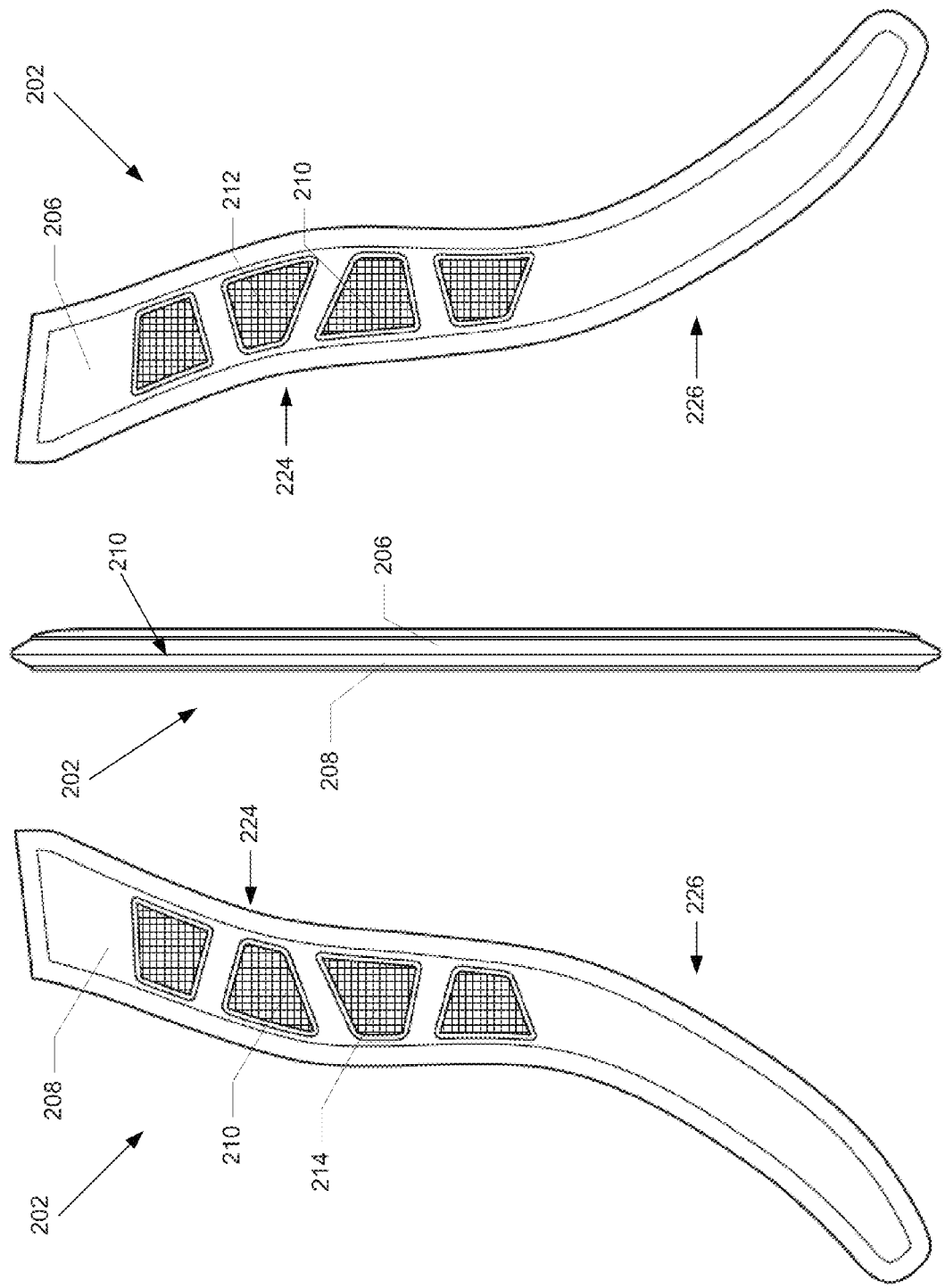

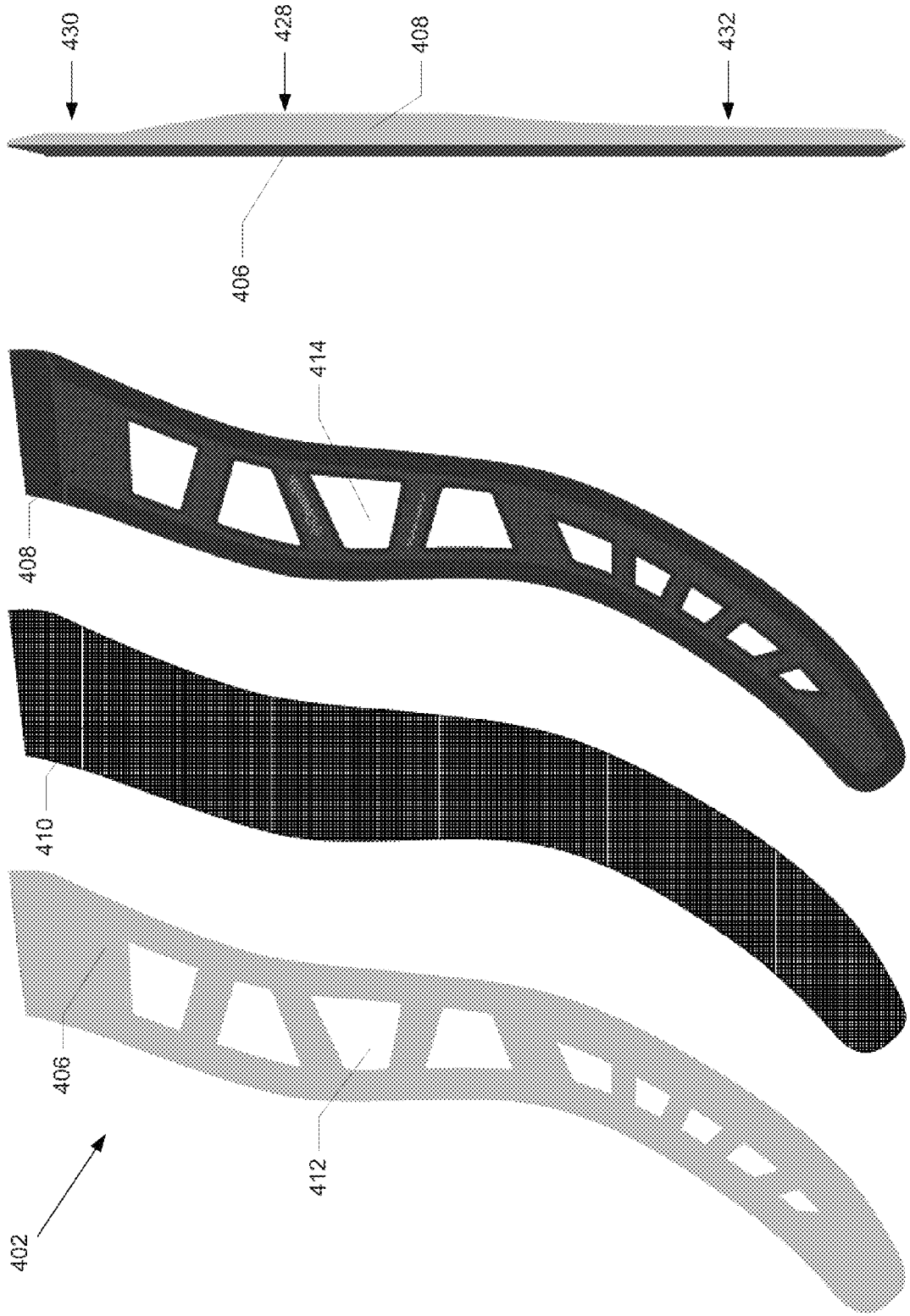

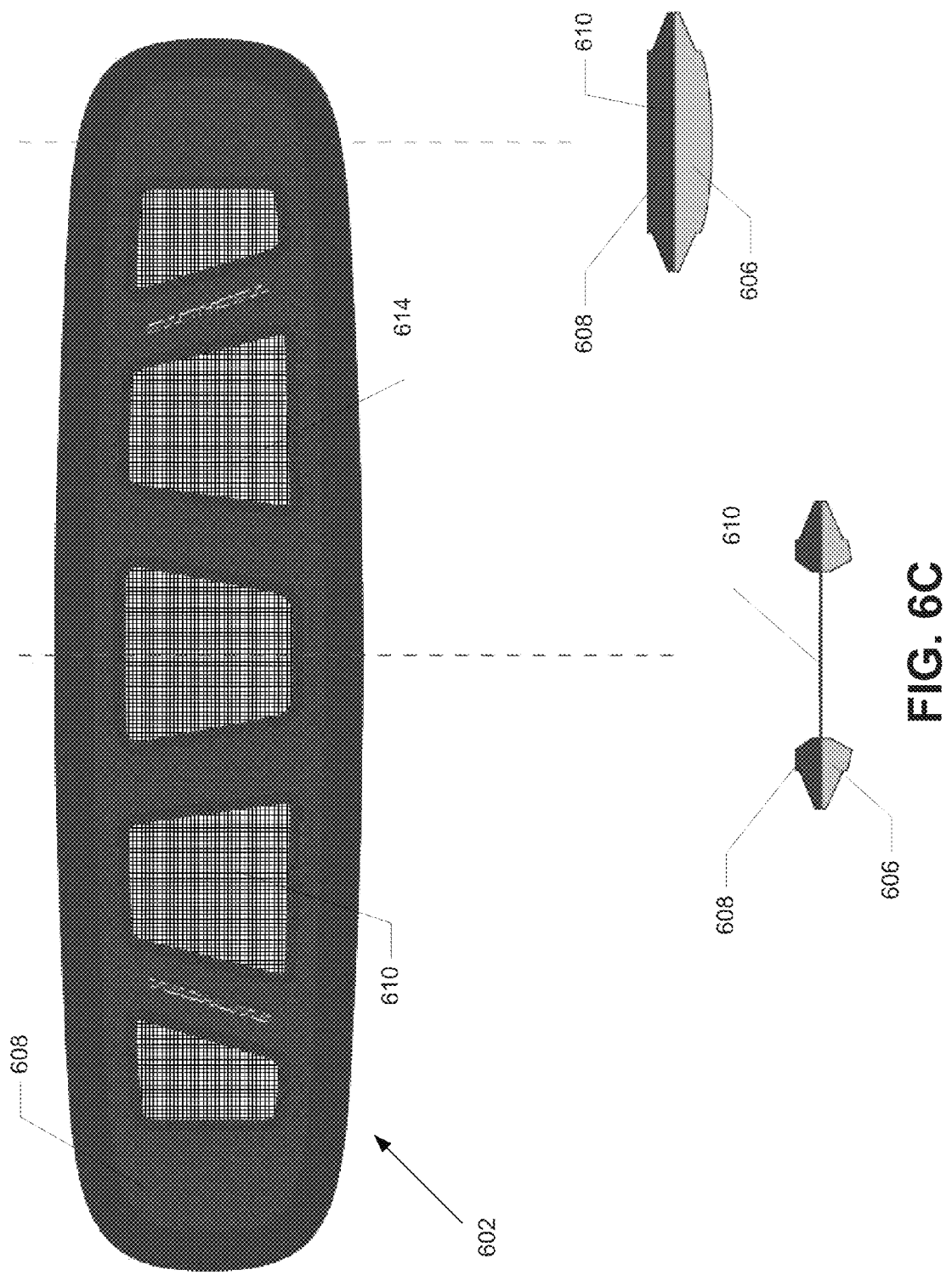

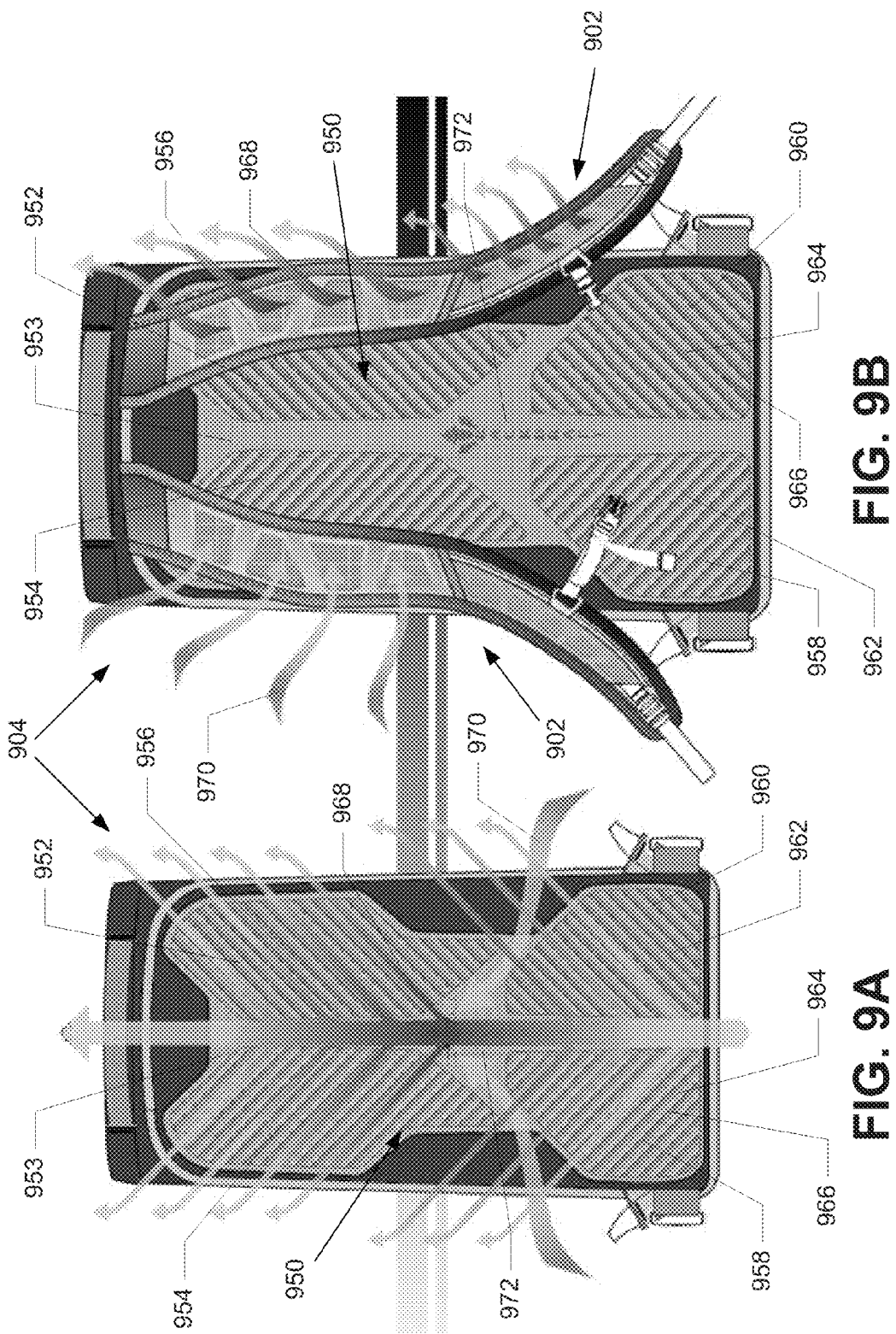

MULTI-LAYER FOAM STRUCTURE

CROSS REFERENCE TO RELATED APPLICATIONS

The present application claims priority to U.S. Provisional Patent Application No. 61/359,801, filed Jun. 29, 2010, entitled "Comolded Straps," the entire disclosure of which is hereby incorporated by reference in its entirety.

TECHNICAL FIELD

Embodiments herein relate generally to multi-layer foam structures, such as for utility packs and/or other load carrying devices.

BACKGROUND

Conventional backpacks and similar load carrying devices are well known and in widespread use around the world. For instance, wilderness hikers, backpackers, cross country skiers, hunters, and other outdoors enthusiasts may pack the necessities for their activities into a backpack typically having a pair of shoulder straps that permits the packed gear to be carried adjacent the user's back. Backpacks also are used for non-sporting activities, for example, as a convenient form of luggage for travelers, and for carrying books, electronic gear, military equipment, and the like.

In many backpacks, a pair of shoulder straps provides the main (or only) support elements for supporting the backpack on the user. Thus, padding typically is provided on the straps to help distribute weight and provide comfort to the user. Similar padding is used with many other types of carrying straps as well, such as may be used with harnesses, luggage, duffle bags, athletic bags, and the like. While this padding serves to make it more comfortable to carry heavy loads for long periods, it also may impede the transfer of moisture and heat, such as may be generated by the active user. This can add to the discomfort of carrying a load, particularly when carrying heavy loads and/or over long periods of time. Thus, some packs use straps that are made of foam covered with a mesh material for enhanced breathability. However, this results in a strap that stretches too much and sacrifices strength.

BRIEF DESCRIPTION OF THE DRAWINGS

Embodiments herein will be readily understood by the following detailed description in conjunction with the accompanying drawings. Embodiments herein are illustrated by way of example and not by way of limitation in the figures of the accompanying drawings.

FIGS. 1A-1G illustrate different views of an example of backpack straps, including a front view of a backpack including the straps (FIG. 1A); a front view of a strap (FIG. 1B), a side view of the strap (FIG. 1C), a rear view of the strap (FIG. 1D), an exploded view of the strap (FIG. 1E), and a front view of the strap with cross-sections (FIG. 1F); and a front view of a finished backpack strap (FIG. 1G), in accordance with various embodiments;

FIGS. 2A, 2B, 2C, and 2D illustrate another example of backpack straps, including a front view of a backpack including the straps (FIG. 2A); and a front view (FIG. 2B), a side view (FIG. 2C), and a rear view (FIG. 2D) of a backpack strap, in accordance with various embodiments;

FIGS. 4A, 4B, 4C, and 4D illustrate different views of an example of a backpack strap, including an exploded view (FIG. 4A), a side cross-sectional view (FIG. 4B), a front view with cross sections (FIG. 4C), and a front view (FIG. 4D), in accordance with various embodiments;

FIGS. 6A, 6B, and 6C illustrate different views of a shoulder strap, including a front view (FIG. 6A), an exploded view (FIG. 6B), and a front view with cross-sections (FIG. 6C), in accordance with various embodiments;

FIGS. 9A and 9B illustrate a backpack and movement of heat and/or moisture through and around breathable backpack straps and a back panel of a backpack, in accordance with various embodiments.

DETAILED DESCRIPTION OF EMBODIMENTS

Figure 1A:
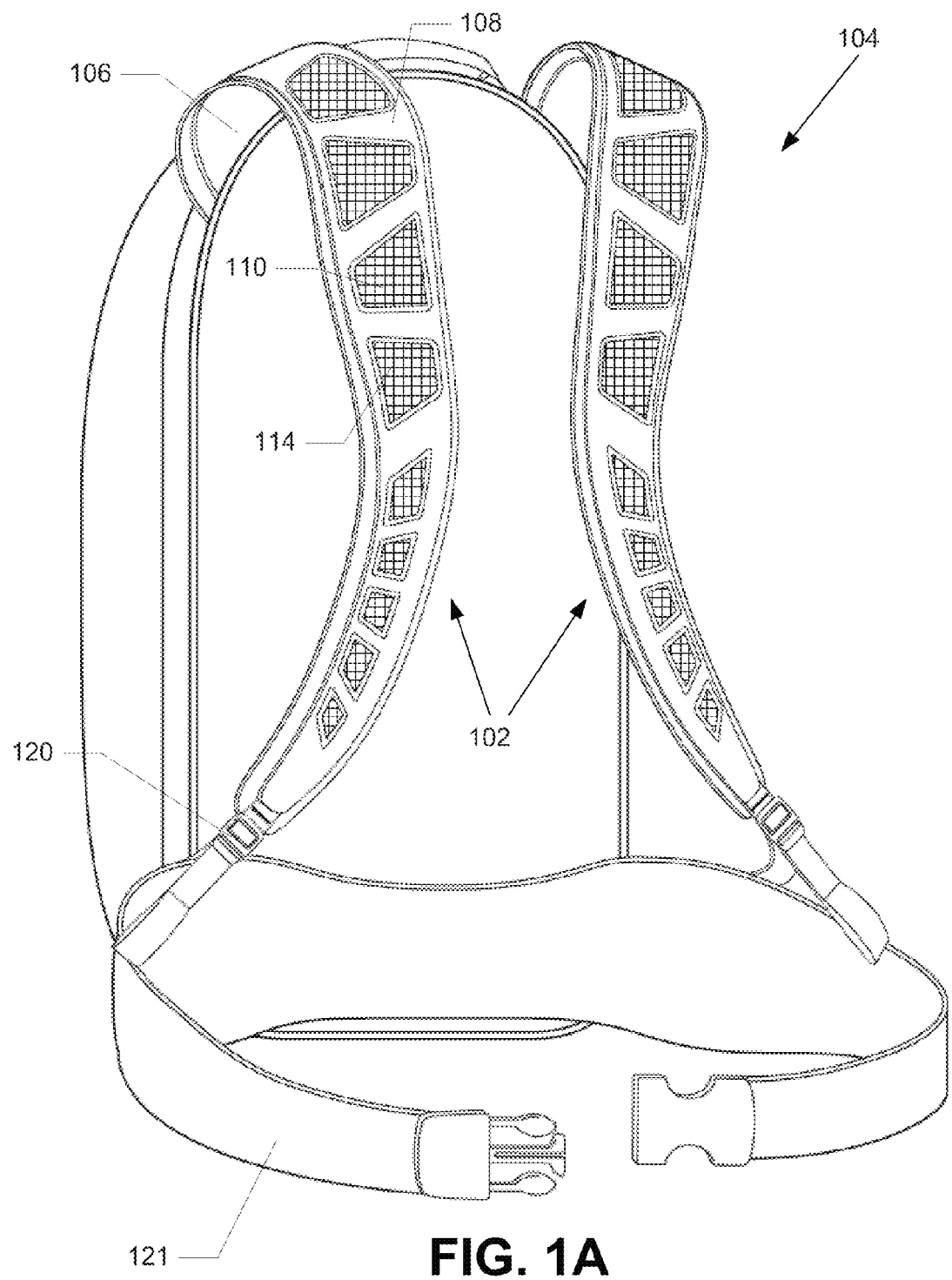
Figure 1E:
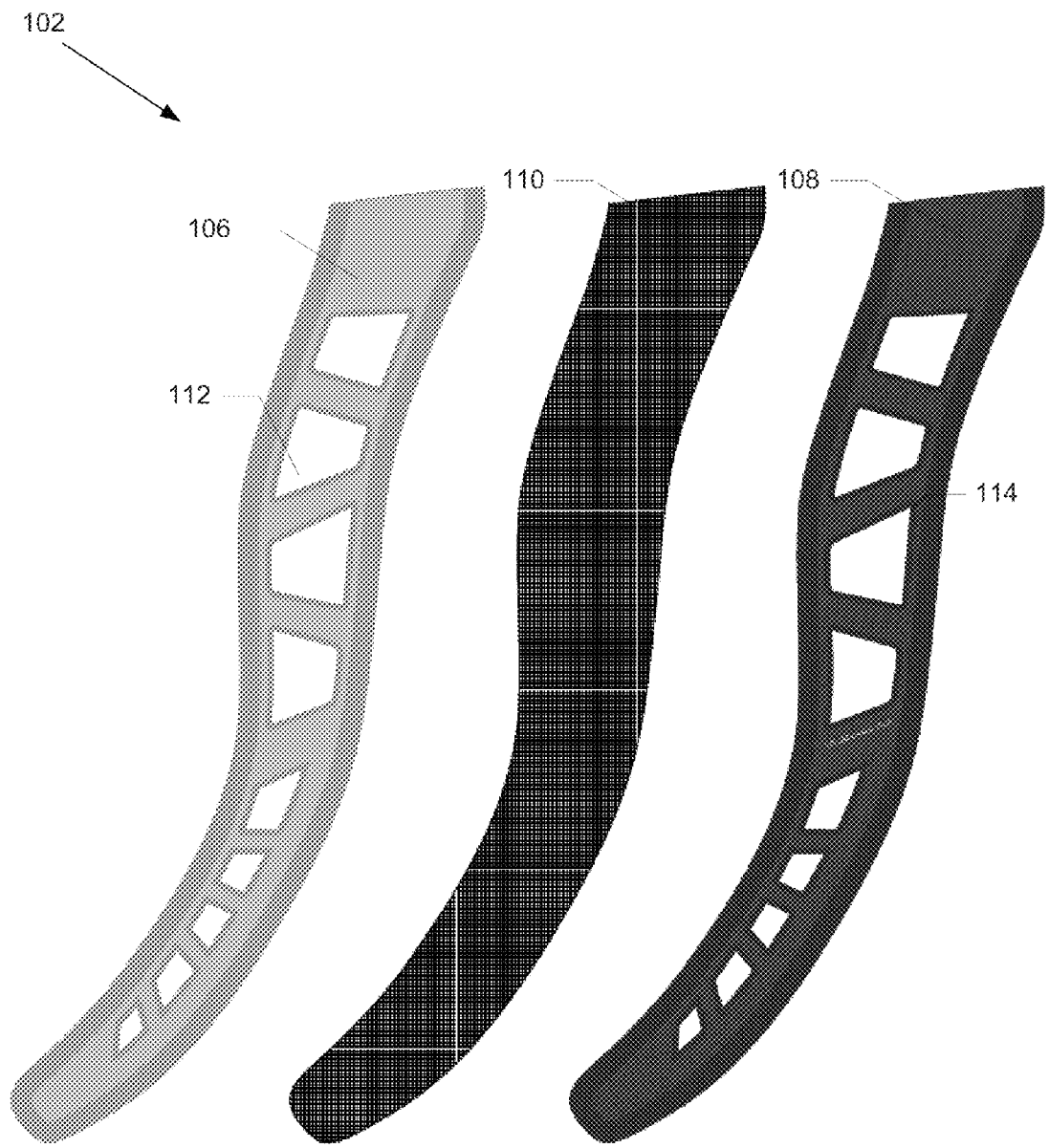

In the following detailed description, reference is made to the accompanying drawings which form a part hereof, and in which are shown by way of illustration of embodiments in which the disclosure may be practiced. It is to be understood that other embodiments may be utilized and structural or logical changes may be made without departing from the scope of the present disclosure. Therefore, the following detailed description is not to be taken in a limiting sense, and the scopes of embodiments, in accordance with the present disclosure, are defined by the appended claims and their equivalents.

Various operations may be described as multiple discrete operations in turn, in a manner that may be helpful in understanding embodiments herein; however, the order of description should not be construed to imply that these operations are order-dependent.

The description may use perspective-based descriptions such as up/down, back/front, and top/bottom. Such descriptions are merely used to facilitate the discussion and are not intended to restrict the application of embodiments herein.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments herein, are synonymous.

Embodiments herein may provide multi-layer foam structures. Embodiments include a multi-layer structure for support elements of a utility pack, such as straps (e.g., backpack straps, duffle bag straps, etc.) and/or panels (e.g., the back panel of a backpack).

The multi-layer structure may have improved breathability while still retaining other desired properties, such as resilience, strength, comfort, padding/cushioning, and/or durability. Some embodiments of the multi-layer structure also may be thinner and/or lighter than conventional padded support structures. In various embodiments, the improved breathability of the strap and/or panel may facilitate the transfer of air, moisture, heat, and/or water vapor through the strap and/or panel, which may improve the comfort of a user carrying the utility pack.

Various embodiments may provide utility pack straps including a reinforcing layer coupled to at least one of an inner structural layer and an outer structural layer. In some embodiments, the straps may include both the inner structural layer and the outer structural layer. The inner structural layer may be coupled to a first side of the reinforcing layer, while the outer structural layer may be coupled to a second side of the reinforcing layer, opposite the first side. The inner structural layer may contact the body of the user when the strap is in use, and may be designed to provide cushioning to the user.

In various embodiments, the inner structural layer, reinforcing layer, and outer structural layer may be coupled together to form a unitary piece. In some embodiments, the inner structural layer and outer structural layer may be comolded together, with the reinforcing layer between the inner structural layer and outer structural layer. The comolding may fuse together the inner structural layer, outer structural layer, and reinforcing layer into a unitary piece. The reinforcing layer embedded into the strap may provide strength and/or stability to the strap, increasing the tensile strength of the strap compared with conventional padded straps. In some embodiments, the breathability of the reinforcing layer may allow the inner structural layer and/or outer structural layer to penetrate and/or permeate the reinforcing layer during the comolding process, which may facilitate the bonding and/or fusing of the inner structural layer to the outer structural layer.

The term "comolded" as used herein may generally refer to one or more applications of molding, sculpting, cutting, carving, casting, and/or injecting of adjoining multiple layers, thereby combining the layers to form a unitary piece. The term unitary piece refers to a self-contained single object, which may include multiple layers permanently bonded and/or fused together.

The inner and outer structural layers may be made from the same or different materials. In various embodiments, one or both of the inner and outer structural layers may be made from a resilient, flexible, elastic and/or padded material, such as a foam (e.g., a thermoplastic foam). In one specific, non-limiting example, the foam may be an ethylene-vinyl acetate (EVA) foam, such as Techlite™ EVA. It will be apparent that other types of moldable materials may be used, such as petroleum-based or rubber foams. In various embodiments, the inner and outer structural layers may be characterized as having various properties, such as density, durometer, specific gravity, elasticity or other characteristics. The foam may be designed to be durable, lightweight, and comfortable, while also being strong enough to accept stitching and/or attachment to the utility pack.

In various embodiments, the inner structural layer and outer structural layer may include one or more features to provide ventilation (e.g., flow of air, moisture, vapor, heat and/or other substances). For example, the inner structural layer and/or outer structural layer may each include a body with one or more openings through the body. The openings may allow air, moisture, vapor, heat, and/or other substances to pass through the structural layer. In some embodiments, the openings of the padding layer may be substantially aligned (i.e., overlap) with the openings of the structural layer to improve the breathability/ventilation of the straps.

In various embodiments, the reinforcing layer may be made from any type of flexible material that provides sufficient strength and stiffness for the intended use of the strap. For instance, the reinforcing layer may be made from nylon or polyester. In some embodiments the reinforcing layer may be a mesh. For example, the reinforcing layer may be made from a durable, heat resilient mesh with a sufficient venting area to enhance breathability. In other embodiments, the reinforcing layer may be a monofilament, such as one or more strands of monofilament nylon. In various embodiments, the reinforcing layer may strengthen the straps without adding significant weight, while still allowing for comfortable breathability. Furthermore, the breathability of the reinforcing layer may facilitate the fusing together of the inner structural layer to the outer structural layer and/or reinforcing layer by allowing the foam to penetrate the reinforcing layer during the comolding process.

In some embodiments, the reinforcing layer may substantially cover the openings in the inner structural layer and/or outer structural layer. For example, the reinforcing layer may be substantially continuous (i.e., the reinforcing layer may be a single piece of material) and may be disposed over substantially an entire area between the inner structural layer and the outer structural layer. The reinforcing layer may increase the strength, stability, and/or breathability of the straps, and may resist moisture absorption (e.g., from sweat, rain, etc.). Together, the combination of the reinforcing layer with the one or more structural layers may provide a high strength to weight ratio while also providing breathability and comfort to the user.

In some embodiments, the reinforcing layer may be disposed only in areas between the inner structural layer and outer structural layer and may not be disposed over the openings. This may facilitate ventilation through the openings, while still providing strength to the strap. In other embodiments, the reinforcing layer may only partially cover the openings in the inner structural layer and/or outer structural layer.

In various embodiments, one or more of the utility pack straps may be coupled to a utility pack, such as a backpack, duffle bag, luggage, briefcase, messenger bag, satchel, golf bag, waist pack, personal pack (e.g., purse), and/or handbag. The straps may also be used for other load-bearing devices that are worn by a user, such as a harness (e.g., climbing, fishing, safety, skydiving, and/or animal harness), medical straps (e.g., splints), seatbelts, suspenders, undergarments (e.g., sports bras), belts, utility belts, slings. These load bearing devices are encompassed by the term utility pack as used herein.

In various embodiments, the straps may be worn or held by the user to carry the utility pack. For example, the straps may be shoulder straps, waist/hip straps, torso straps, a harness, and/or hand straps.

In some embodiments, the multi-layer structure described herein for a strap may also be used for other load-bearing structures, such as a panel. Examples of load-bearing panels include, but are not limited to, a back panel of a backpack (i.e., the panel of material that sits on the back of the user when the backpack is worn), a back panel of a messenger bag or satchel, a panel of a duffle bag, a support panel for a golf bag, and/or a panel for a chair, cot, and/or hammock. The utility pack panel may also be used in applications where the panel will not typically be in contact with the user's body, such as for a bottom panel of a duffle bag, to provide ventilation for an interior portion and/or contents of the utility pack.

As used herein, the term "strap" generally refers to an elongated portion of material for supporting a load. The term "panel" generally refers to a larger surface for supporting a load.

In some embodiments, the inner structural layer and outer structural layer may have different response properties, such as density and/or hardness (durometer). For example, the inner structural layer may be softer (i.e., of lower hardness/durometer) than the outer structural layer in order to provide cushioning to the user. The outer structural layer may be harder than the inner structural layer, for instance to have better wear characteristics (e.g., resistance to puncture, scratches, etc.), to provide aesthetic appeal, to increase strength, provide structure/rigidity, and/or to help distribute the load over the surface area of the strap. In other embodiments, the inner and outer structural layers may have the same response properties.

Similarly, in some embodiments, the inner structural layer and/or outer structural layer may include regions of varying response properties within the inner structural layer and/or outer structural layer. For example, the inner structural layer may include a region of higher hardness where the strap contacts the user's shoulder, and a region of lower hardness where the strap contacts the user's lower chest.

The terms hardness and durometer are used interchangeably herein to refer to a measure of compressibility of a material when a force or load is applied. The material of the inner and/or outer structural layers may also have characteristics of elasticity so that the material returns to its original shape when the force or load is removed.

Although the structural layers are referred to herein as having material response properties designated as low, medium, and high, one of skill in the art will appreciate that these terms are relative. In one embodiment where the material response property is durometer, for instance, the low, medium, and high may correspond to 55, 60, and 65 c; or 55, 65, and 75 c. In some embodiments, the inner structural layer may have a hardness of 40 c for cushioning, while the outer structural layer may have a hardness of 45 c for resilience and stiffness. In some embodiments, the strap may thus be durable, lightweight, and comfortable, yet also strong enough to accept stitching and attachment to a utility pack. In other embodiments, greater or lower response property materials also may be used to suit the desired application.

In various embodiments, the openings of the inner and/or outer structural layers may be strategically arranged over a surface of the structural layer, for instance to provide structural support to the strap as well as facilitate breathability/ventilation. In some embodiments, the openings may also serve to reduce the weight of the strap, which may increase the comfort of the user. In some embodiments, the openings may be oriented in a direction to facilitate transfer of air, moisture, vapor, and/or heat away from the user's body. In further embodiments, the openings may include one or more air directing features, such as slanted portions, that direct the flow of air, moisture, vapor, and/or heat in specific directions, such as away from the body of the user.

In various embodiments, the ratio of material to openings over a cross-sectional area of the structural layer may be adjusted to provide a strap with a desired weight, thickness, breathability, strength, and/or degree of padding. In some embodiments, the inner and/or outer structural layer may include openings that range from about 20% to about 80% of the cross-sectional area of the strap, for instance, about 30%, 40%, 50%, 60%, or 70% of the cross-sectional area of the strap. In one specific, non-limiting example, the structural layer may include openings that cover about 50-70% of the cross-sectional area of the strap, for instance about 60%, with about 40% of the cross-sectional area covered by the structural layer material. In various embodiments, at least a portion of the reinforcing layer may be visible through the openings in the structural layer. As discussed above, in some embodiments, the openings of the inner structural layer may be fully or partially aligned (i.e., overlapping) with the openings in the outer structural layer. In other embodiments, the openings of the inner structural layer and outer structural layer may be non-overlapping.

In various embodiments, a length, a width, and/or a thickness of the inner structural layer and/or the outer structural layer may be designed to reduce weight, increase strength/durability, and/or increase cushioning for the user. For example, a strap of smaller width and/or thickness may be used for applications involving lighter loads in order to decrease the weight of the utility pack. In contrast, a strap of larger width and/or thickness may be used for applications involving heavier loads in order to increase the strength and/or durability of the straps, to provide more cushioning for the user, and/or to better distribute the load. In some embodiments, the thicknesses of the inner and/or outer structural layer vary along the length of the structural layer. For example, the thickness of the inner structural layer may be larger in a middle portion of the length of the structural layer to provide padding where the strap contacts the shoulder of the user. The thickness of the inner structural layer may be smaller at a top end portion of the strap to facilitate attachment of the top end portion to the utility pack.

In various embodiments, the strap also may include one or more binding layers, and may be attached to the utility pack using conventional materials and/or fasteners, such as nylon webbing. In particular embodiments, the inner structural layer, outer structural layer, and reinforcing layer may make up only a portion of the strap, whereas in other embodiments substantially the whole strap may include the inner structural layer, outer structural layer, and/or reinforcing layer as described herein.

In various embodiments, the strap may be formed by placing the inner structural layer, the reinforcing layer, and the outer structural layer in a mold and comolding the layers into a unitary strap. In some embodiments, the inner structural layer, outer structural layer, and reinforcing layer may be cut separately prior to insertion in the mold. In other embodiments, one or more of the layers may be cut after the comolding. In some embodiments, the comolding may include pellet pour and/or liquid pour of materials into the mold.

In some embodiments, the inner structural layer, reinforcing layer, and outer structural layer may be coupled together by an adhesive and/or stitching. In yet other embodiments, the inner structural layer and outer structural layer may be formed from a single material, with the reinforcing layer disposed through a middle portion of the material. For example, the reinforcing layer may be held in the mold, and foam may be poured, injected, and/or molded around the reinforcing layer to form the inner structural layer and the outer structural layer. In some embodiments, the response properties of one or more regions of the inner structural layer and/or outer structural layer may be adjusted during manufacturing. For example, one or more regions of the inner and/or outer structural layer may be formed with a greater density and/or hardness/durometer than one or more other regions.

The reinforcing layer may be permanently coupled to the inner structural layer and/or outer structural layer over substantially the entire contact area between the reinforcing layer and the inner structural layer and/or outer structural layer. In some embodiments, the inner structural layer and outer structural layer may be substantially fused together at the junction between the structural layers. In other embodiments, the reinforcing layer may be permanently coupled to the inner structural layer and/or outer structural layer at the edges of the layers.

In various embodiments, a panel for a utility pack or other load-bearing device may be provided, such as a back panel for a backpack, a bottom panel for a duffle bag, and/or a support panel for a golf bag. The utility pack panel may include a reinforcing layer coupled to at least one of an inner structural layer and an outer structural layer. In some embodiments, the panel may include both an inner structural layer and an outer structural layer, with the reinforcing layer coupled between the inner structural layer and outer structural layer. The inner and outer structural layers may each have one or more openings to provide breathability to the user and/or an interior portion of the utility pack. In some embodiments, the openings may be arranged to direct air, moisture, vapor, and/or heat in one or more directions, such as upward and/or toward the sides of the back panel. This may improve the air flow for the backpack panel when resting on the user's back, thereby providing comfort to the user. In some embodiments, the panel may include one or more recessed portions that form a channel for air and/or heat to flow between the panel and the user's body.

In some embodiments, the inner structural layer may be of varying thickness to reduce the surface area of the panel that is in contact with the body, and leave one or more recessed portions that form channels to allow air flow. For example, the inner structural layer may include a plurality of ridges, configured so that the body contacts the inner structural layer at and/or near a top portion of the ridges, and a bottom portion of the ridges is recessed from the body. In this configuration, air may flow through the bottom portion of the ridges. In some embodiments, the ridges may be oriented to direct air flow. For example, the ridges may be oriented diagonally upwards from the center of the back panel toward the sides. This orientation may facilitate flow of hot air away from the back panel and/or flow of cool air toward the back panel.

In some embodiments, the inner structural layer may be made up of multiple separate portions, such as 2, 3, or 4 portions. The portions of the inner structural layer may be arranged on the back panel to contact the back of the user in strategic locations to provide support, comfort, and/or stability, such as the shoulder blades and/or the lower back. The areas in between the portions of the inner structural layer may be recessed from the user's body to allow flow of air, moisture, vapor, and/or heat.

FIGS. 1A-1G illustrate different views of an example of utility pack straps 102 for a backpack 104, including a front view of backpack 104 (FIG. 1A); a front view (FIG. 1B), side view (FIG. 1C), rear view (FIG. 1D), an exploded view (FIG. 1E), and a cross-sectional view (FIG. 1F) of utility pack strap 102; and a front view of a modified version of utility pack strap 102 (FIG. 1G), in accordance with various embodiments. As shown in FIG. 1A, backpack 106 includes a pair of backpack straps 102 designed to be worn on the shoulders of a user to carry backpack 104. Straps 102 include an inner structural layer 106, an outer structural layer 108, and a reinforcing layer 110 disposed between inner structural layer 106 and outer structural layer 108. Inner structural layer 106, outer structural layer 108, and reinforcing layer 110 may be comolded together to be a unitary piece.

Inner structural layer 106 includes a plurality of openings 112, and outer structural layer 108 also includes a plurality of openings 114 for breathability. The openings 112 of inner structural layer 106 are substantially aligned (i.e., overlapping) with the openings 114 of outer structural layer 108 to facilitate the transfer of air, moisture, vapor, and/or heat through the openings 112 and 114.

Figure 1F:
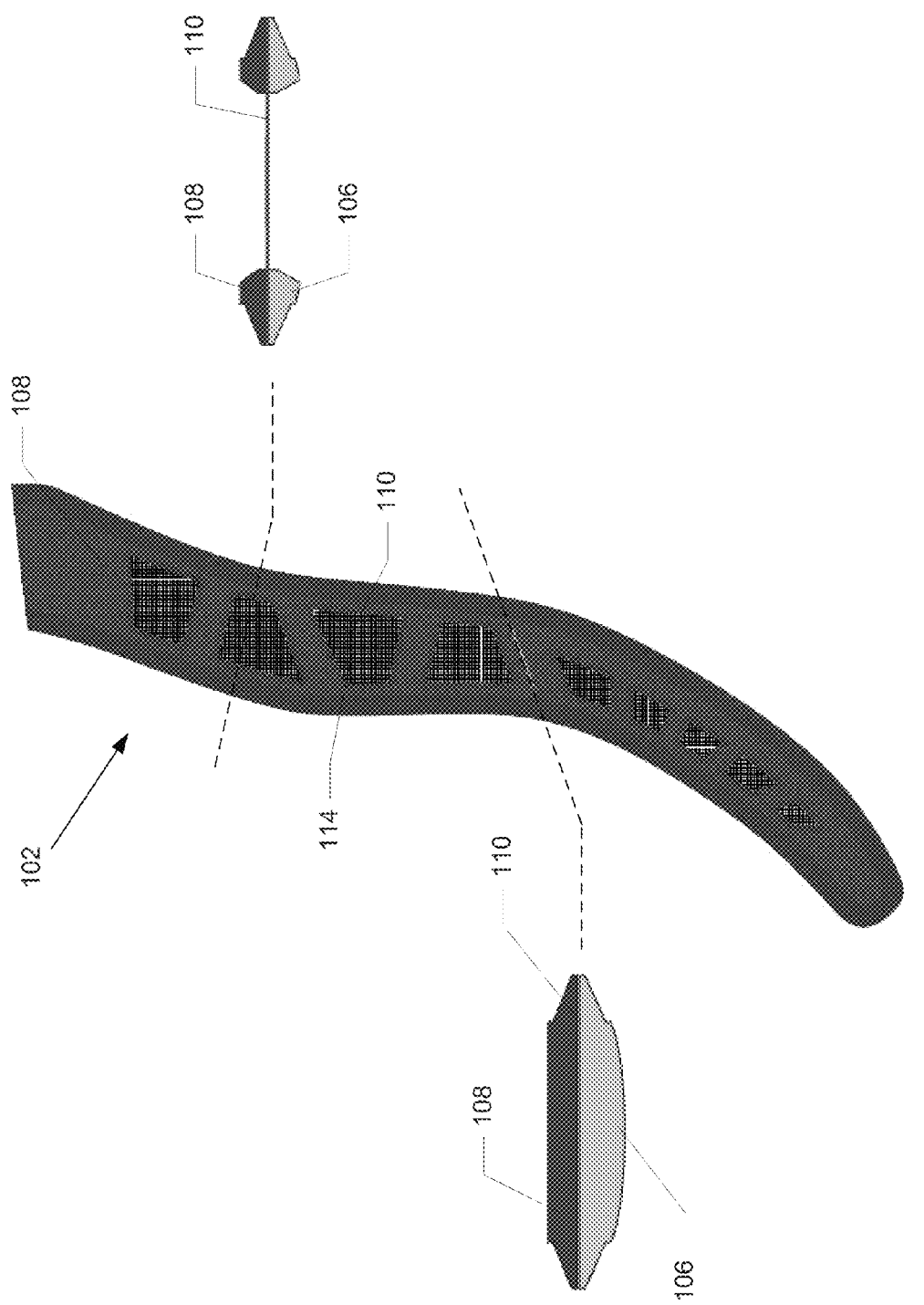

Inner structural layer 106 and outer structural layer 108 may have different response properties. For example, the inner structural layer 106 may have a hardness and/or density that is less than a hardness and/or density, respectively, of the outer structural layer 108 to provide cushioning/padding for the user. The outer structural layer 108 may have a greater hardness and/or density to provide resistance to wear, such as punctures or scratches. In some embodiments, as shown in FIG. 1F, inner structural layer 106 may be thicker than outer structural layer 108 to facilitate cushioning.

Inner structural layer 106 and outer structural layer 108 may be made of a resilient, elastic and/or padded material, such as a foam. Suitable materials include, but are not limited to, EVA, such as Techlite™ EVA. Reinforcing layer 110 is a mesh, such as nylon mesh. The mesh may provide strength and/or rigidity to strap 102 and may be a durable, heat resilient mesh with a sufficient venting area to enhance breathability.

Accordingly, reinforcing layer 110 provides strength and stability to strap 102 while also facilitating breathability through openings 112 and 114. As shown in FIGS. 1A-G, reinforcing layer 110 is continuous and covers openings 112 and 114. The breathability of reinforcing layer 110 allows ventilation through openings 112 and/or 114. Alternatively, a discontinuous reinforcing layer comprising multiple reinforcing elements, such as multiple mesh portions and/or monofilaments, may be utilized. In some embodiments, reinforcing layer 110 may not cover openings 112 and/or 114, or may only partially cover openings 112 and/or 114.

While openings 112 and 114 are shown relatively large, other embodiments may include other shapes, sizes, and/or configurations of the openings. For example, the openings may be one or more elongated slits in a parallel or zig-zag pattern. It will be apparent that many shapes, sizes, and/or configurations of the openings are possible.

Strap 102 further includes a buckle 120 for adjusting the position of strap 102 and/or backpack 104 on the user's body. Additionally, a waist strap 121 may be used to couple the backpack 104 around the user's waist and/or hips to distribute the load of backpack 104 and/or provide stability.

Figure 1G:
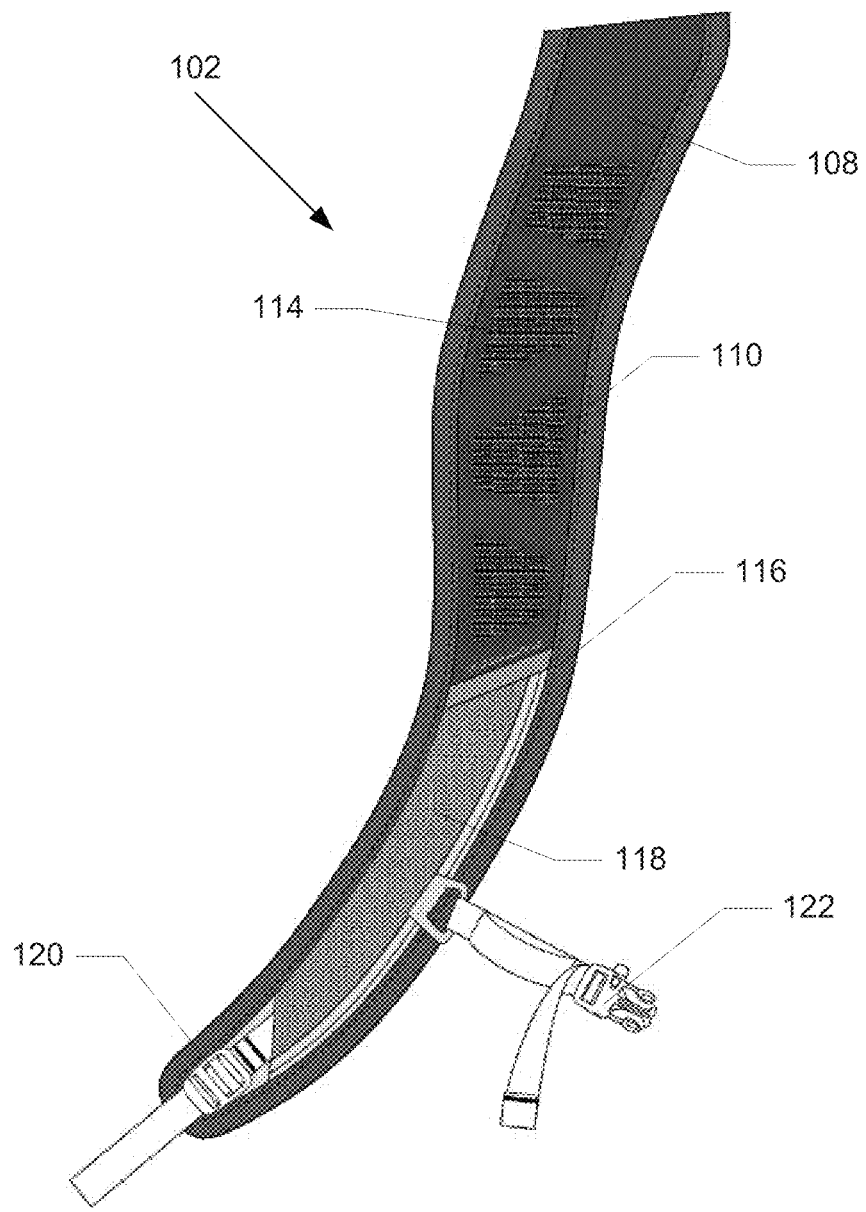
Figure 2A:
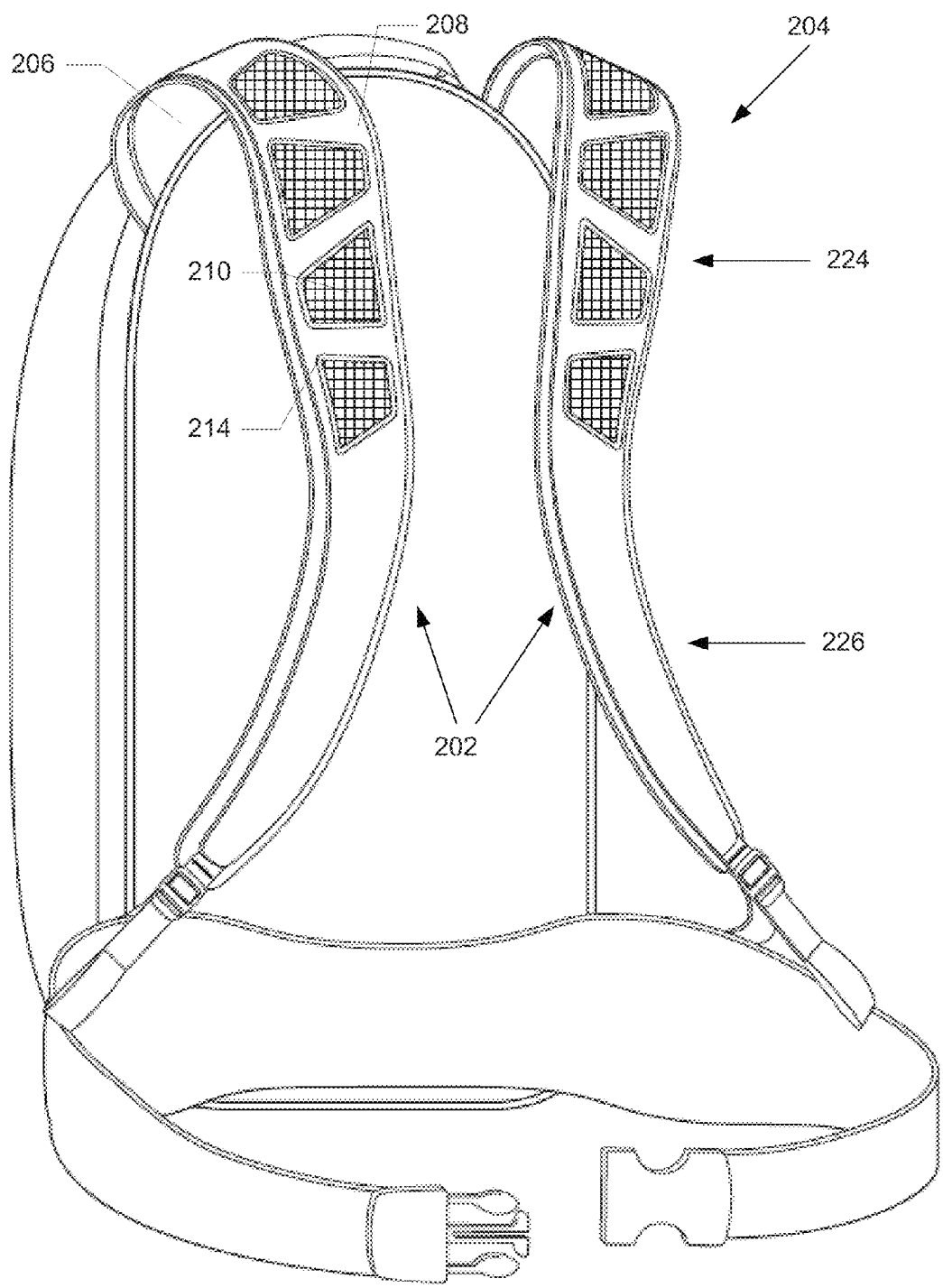

As shown in FIG. 1G, a binding material 116 may be coupled to the edges of strap 102, and a webbing 118 may cover a portion of strap 102, to provide structural integrity and facilitate attachment of the strap 102 to backpack 104. Additionally, a torso strap 122 may be used to couple the pair of straps 102 to one another for comfort and/or stability.

FIGS. 2A-2D show another embodiment of straps 202 for a backpack 204, the straps having a reinforcing layer 210 disposed between an inner structural layer 206 and an outer structural layer 208. Inner structural layer 206 and outer structural layer 208 include openings 212 and 214, respectively, disposed only in an upper portion 224 of strap 202. Accordingly, the straps 202 may provide breathability in the upper portion 224 which contacts the shoulders of the user, while having increased strength and/or durability in a lower portion 226 of the straps 202.

Figure 3A:
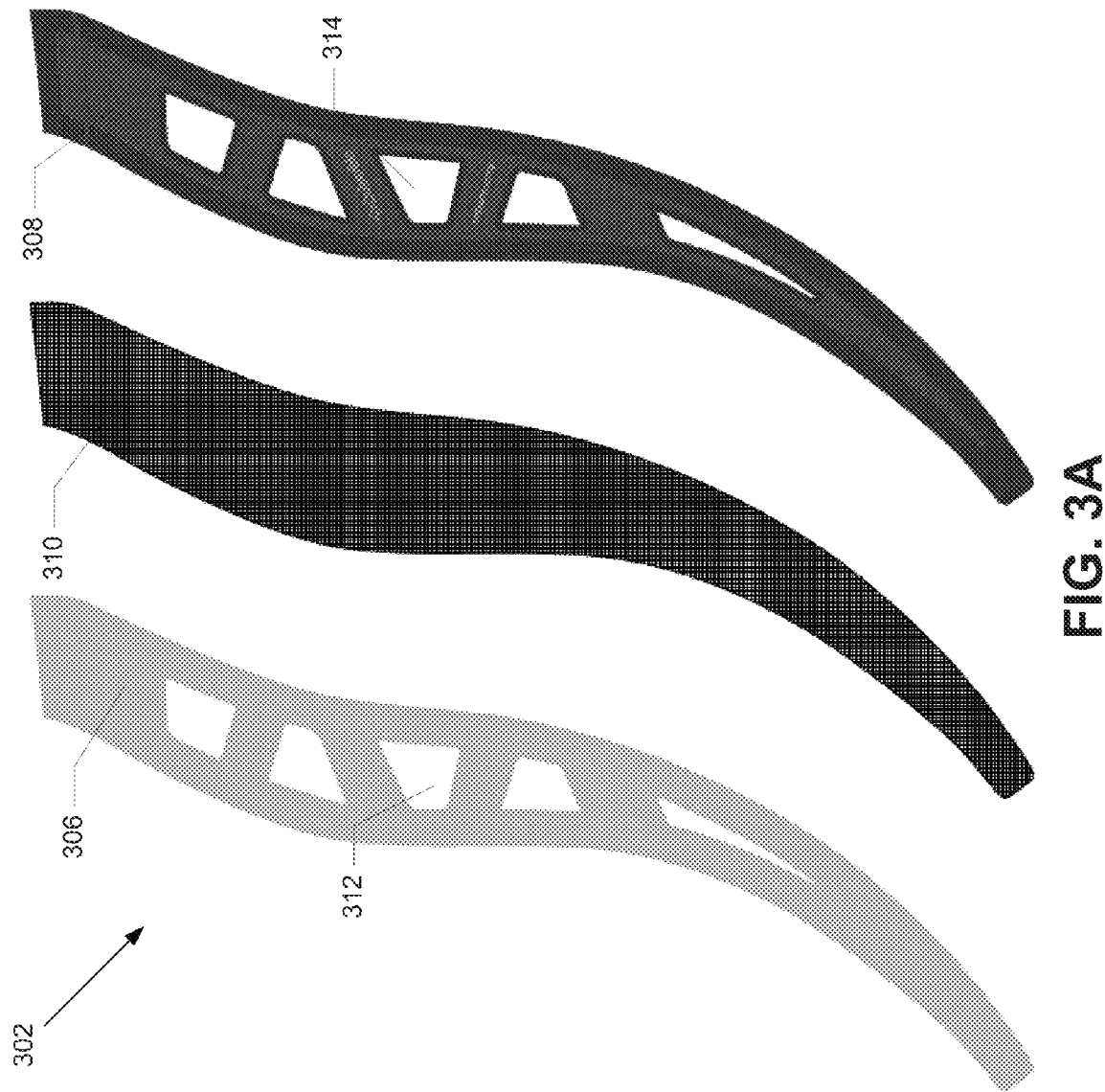
FIGS. 3A and 3B illustrate an exploded view and a front view with cross-sections, respectively, of a backpack strap in accordance with various embodiments.
Figure 3B:
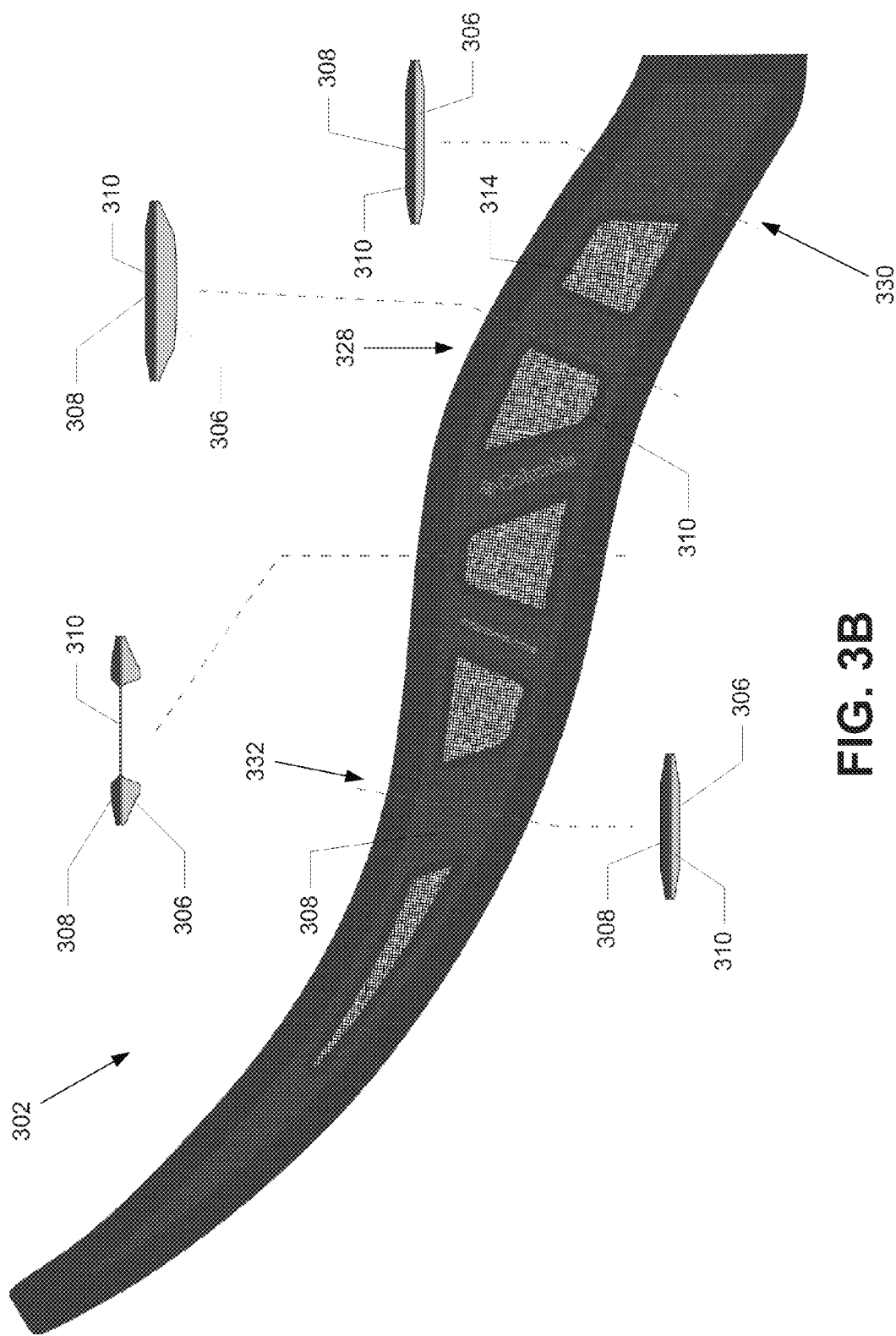
Figure 4C:
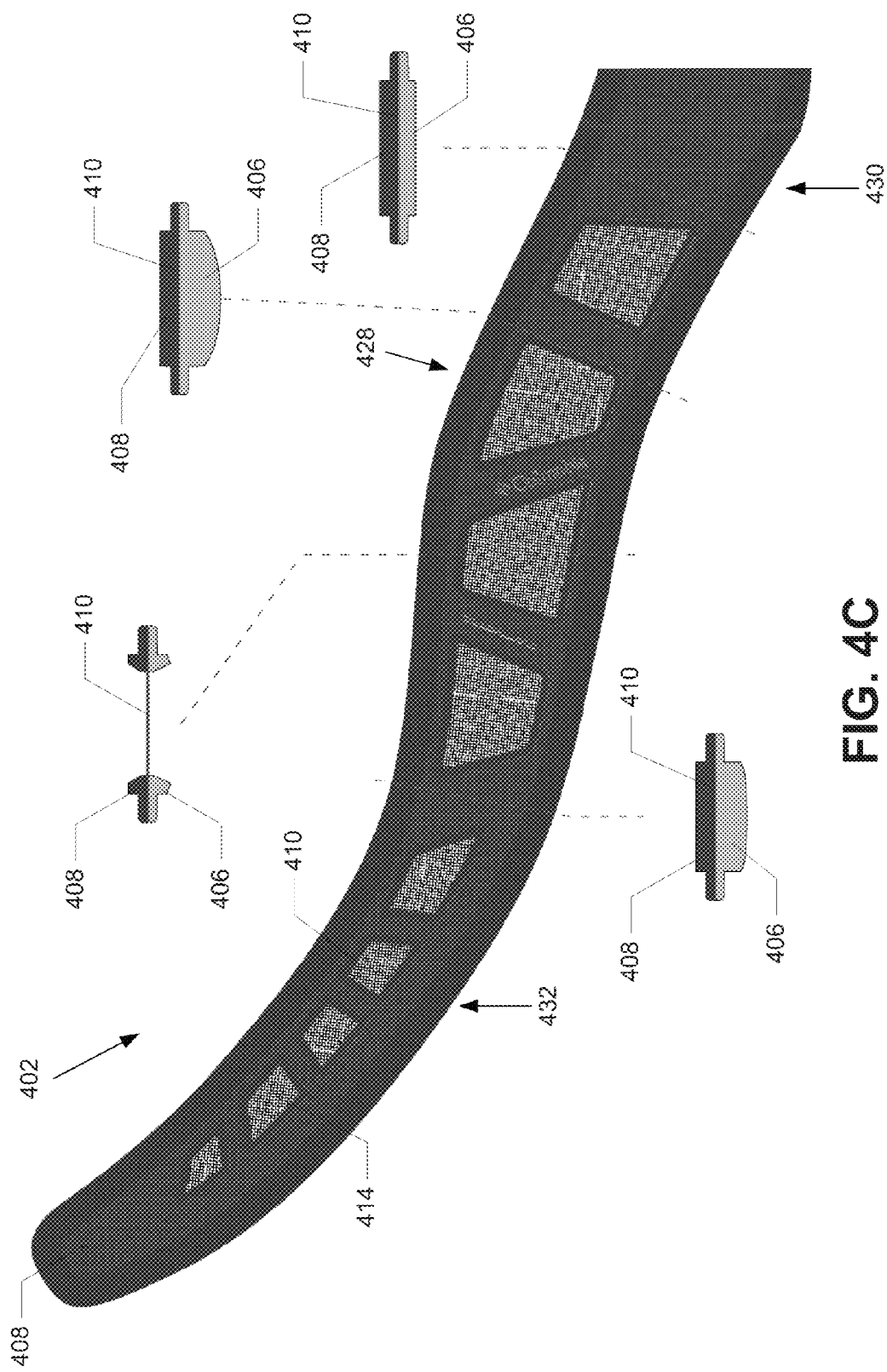
Figure 4D:
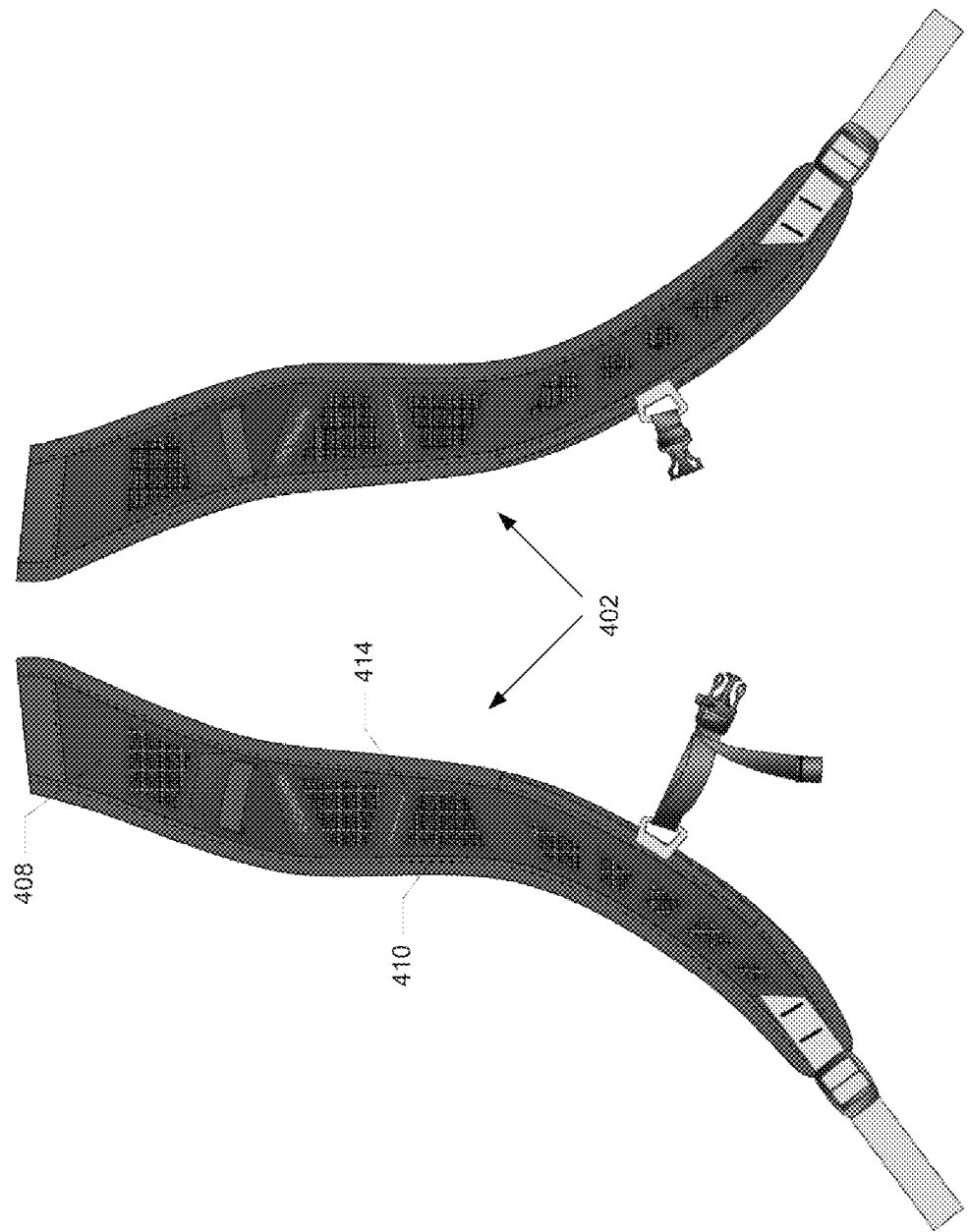

FIGS. 3A-3B show an alternative embodiment of a backpack strap 302 having a smaller width than the backpack strap 102 from FIGS. 1A-G, thereby having a lighter weight. Similar to backpack strap 102, backpack strap 302 includes a reinforcing layer 310 disposed between an inner structural layer 306 and an outer structural layer 308. As shown in the cross-sectional views in FIG. 3B, a thickness of inner structural layer 306 may vary along a length of the strap 302. The thickness of inner structural layer 306 may be greater at a middle portion 328 to provide additional cushioning where the strap contacts the user's shoulders, and may be lesser at end portions 330 and/or 332 to reduce weight and/or facilitate attachment of the strap 302 to the backpack. The thickness of outer structural layer 308 may be substantially constant over the length of strap 302.

FIGS. 4A-4D show an embodiment of a backpack strap 402 having an increased thickness compared with backpack strap 102 from FIGS. 1A-G. The increased thickness of backpack strap 402 may provide additional cushioning to the user and may be suitable for use with heavy loads. The thickness of an inner structural layer 406 of strap 402 varies along a length of strap 402. The thickness of inner structural layer 406 may be greater at a middle portion 428 to provide additional cushioning where the strap contacts the user's shoulders. The thickness may be lesser at a top end portion 430 to facilitate attachment of the strap 402 to the backpack. The strap 402 may have an intermediate thickness at a bottom end portion 432. In contrast, the thickness of outer structural layer 308 may be substantially constant over the length of strap 302.

Figure 5A:
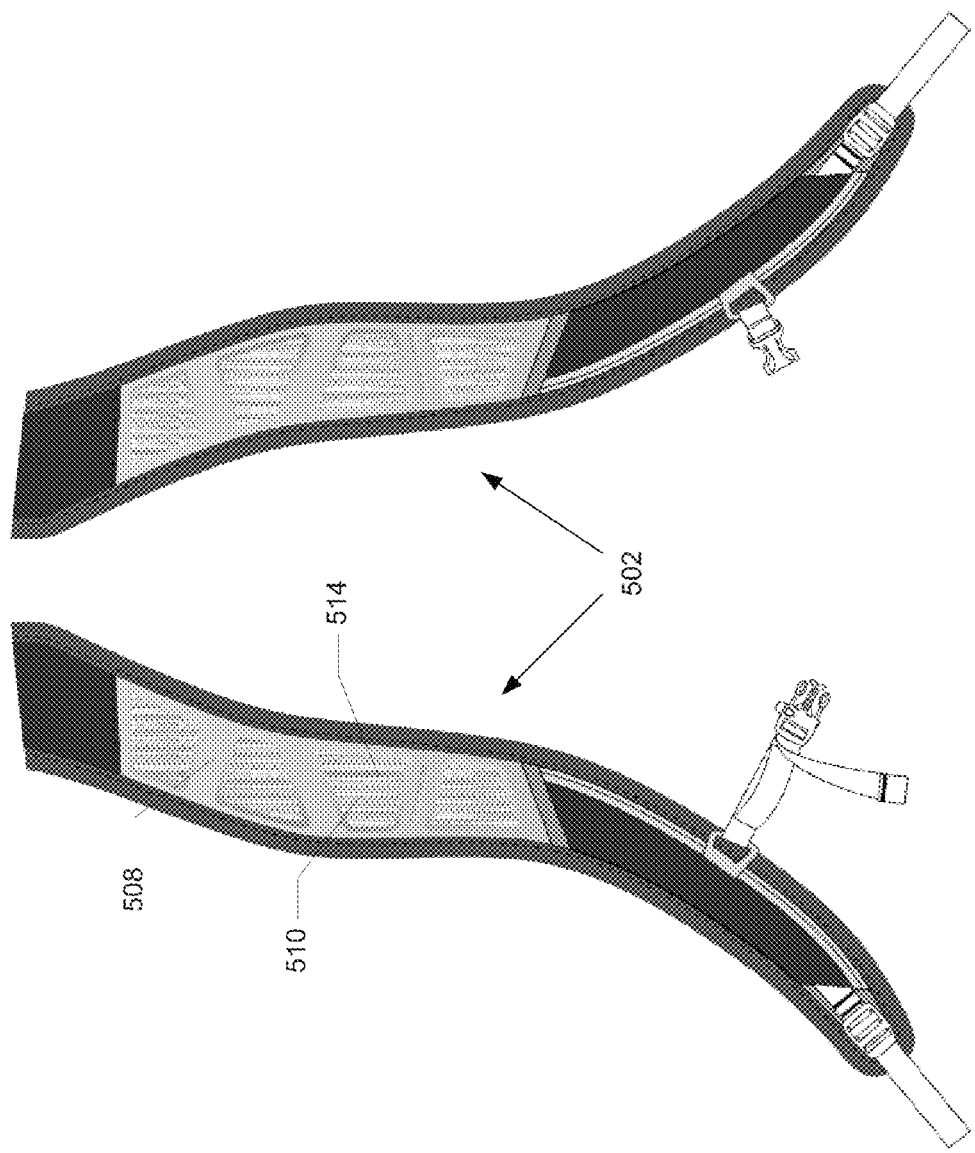
FIG. 5A illustrates a front view of an example of backpack straps, in accordance with various embodiments.
Figure 5B:
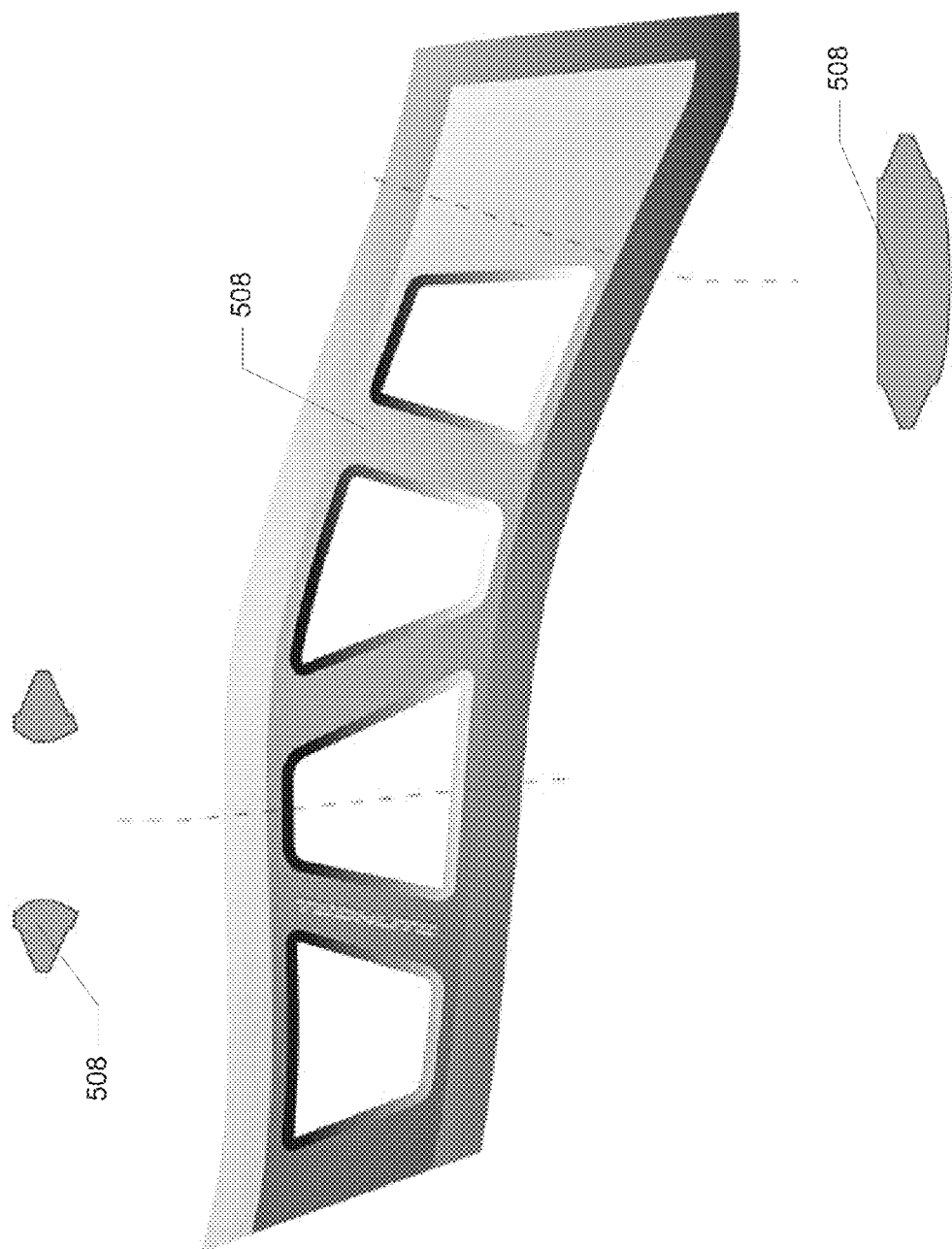
FIG. 5B illustrates a front view with cross-sections of an outer structural layer for the backpack strap of FIG. 5A, in accordance with various embodiments.

FIGS. 5A-5B illustrate a backpack strap 502 without an inner structural layer. Backpack strap 502 includes an outer structural layer 508 coupled to a reinforcing layer 510. Outer structural layer 508 is designed to provide cushioning to the user and distribute the load of the backpack over the strap 502. As shown in FIGS. 5A-B, in some embodiments, outer structural layer 508 may be disposed in only a portion of the strap 502.

Reinforcing layer 510 may be continuous and coupled to a bottom surface of the outer structural layer 508. Accordingly, the reinforcing layer 510 may contact the user when strap 502 is in use. In other embodiments, reinforcing layer 510 may not be continuous, and may be disposed substantially only over openings 514 in outer structural layer 508.

In other embodiments, a utility pack strap may include an inner structural layer coupled to a reinforcing layer, but may not include an outer structural layer.

Figure 6A:
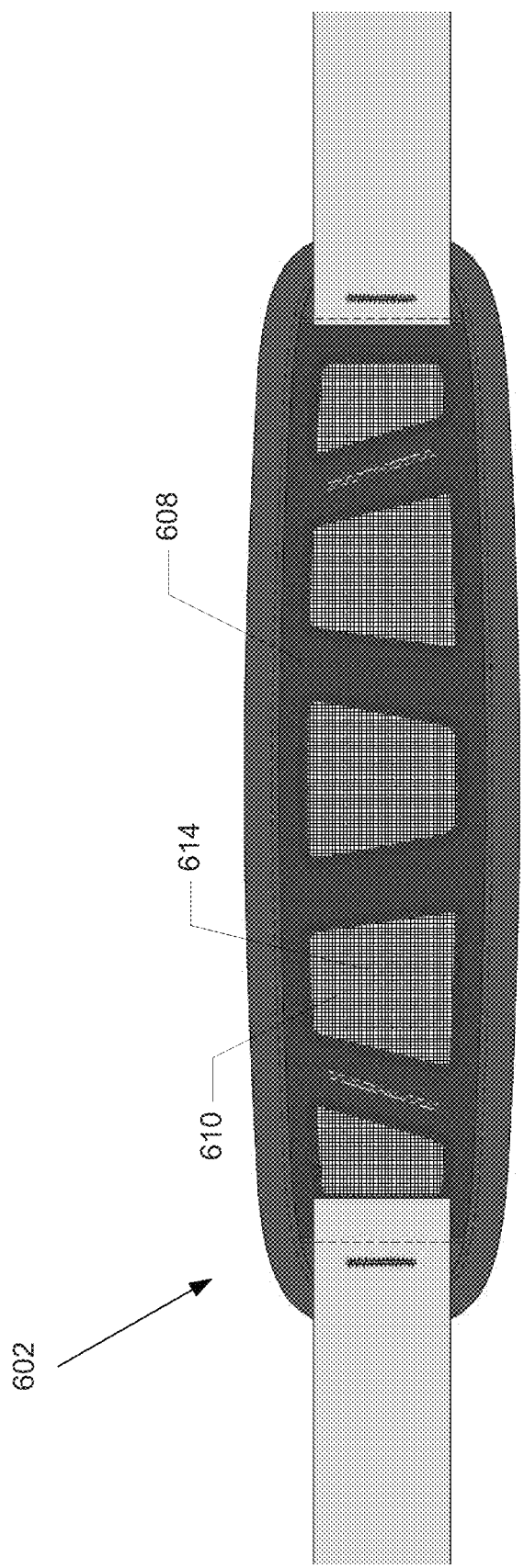
Figure 6B:
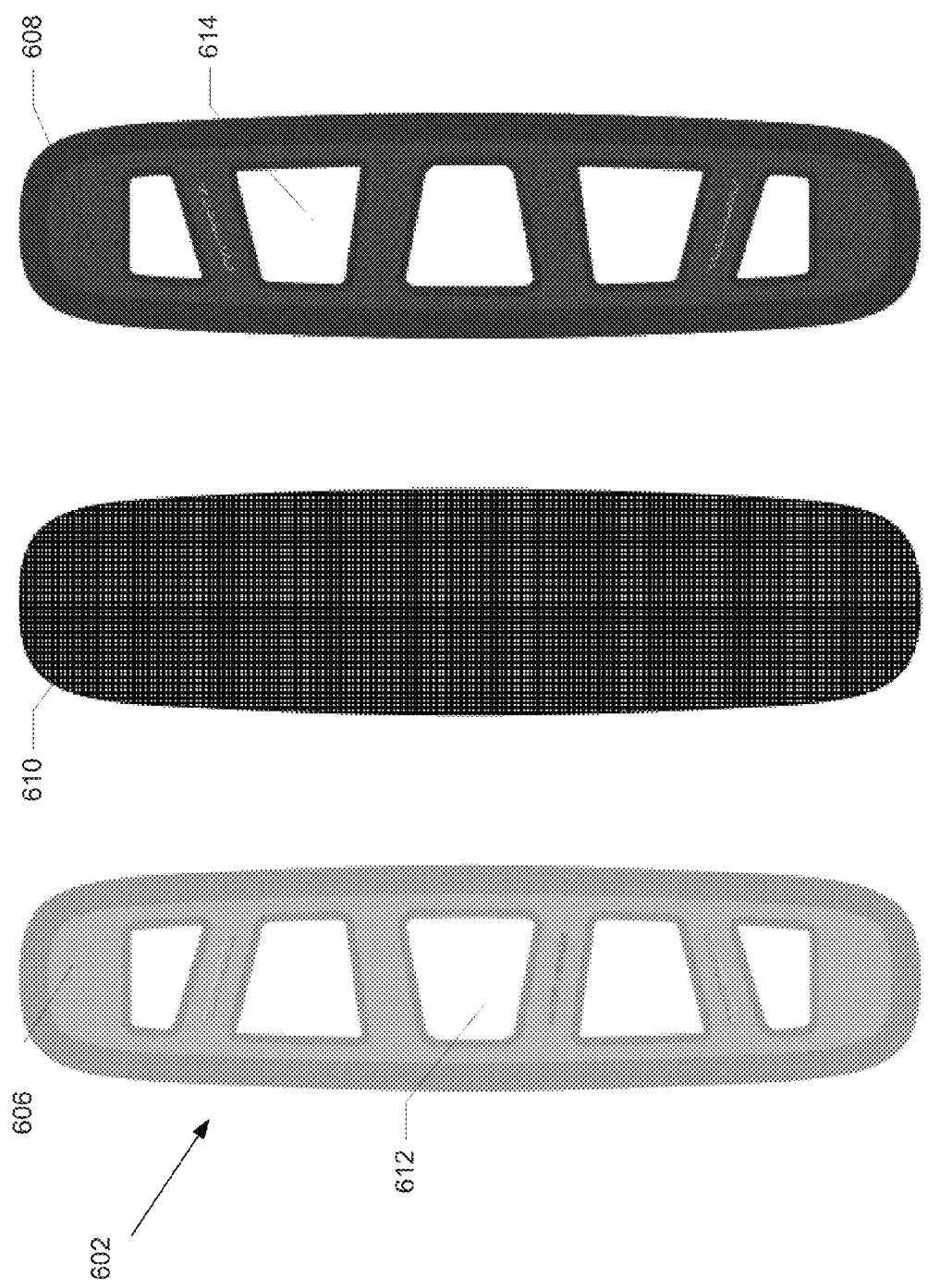
Figure 7A:
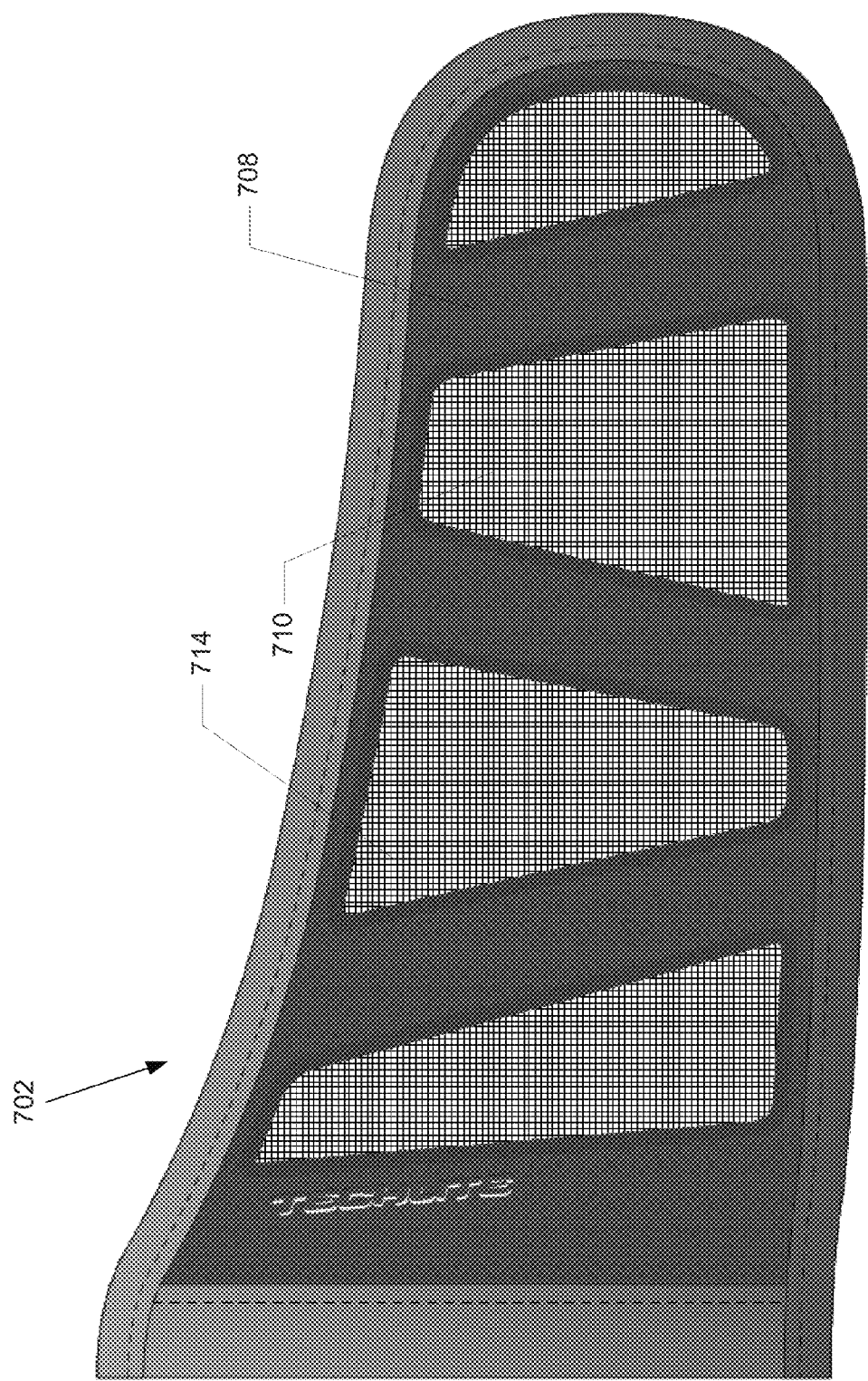
FIGS. 7A, 7B, and 7C illustrate different views of a waist strap, including a front view (FIG. 7A), an exploded view (FIG. 7B), and a front view with cross-sections (FIG. 7C), in accordance with various embodiments.
Figure 7B:
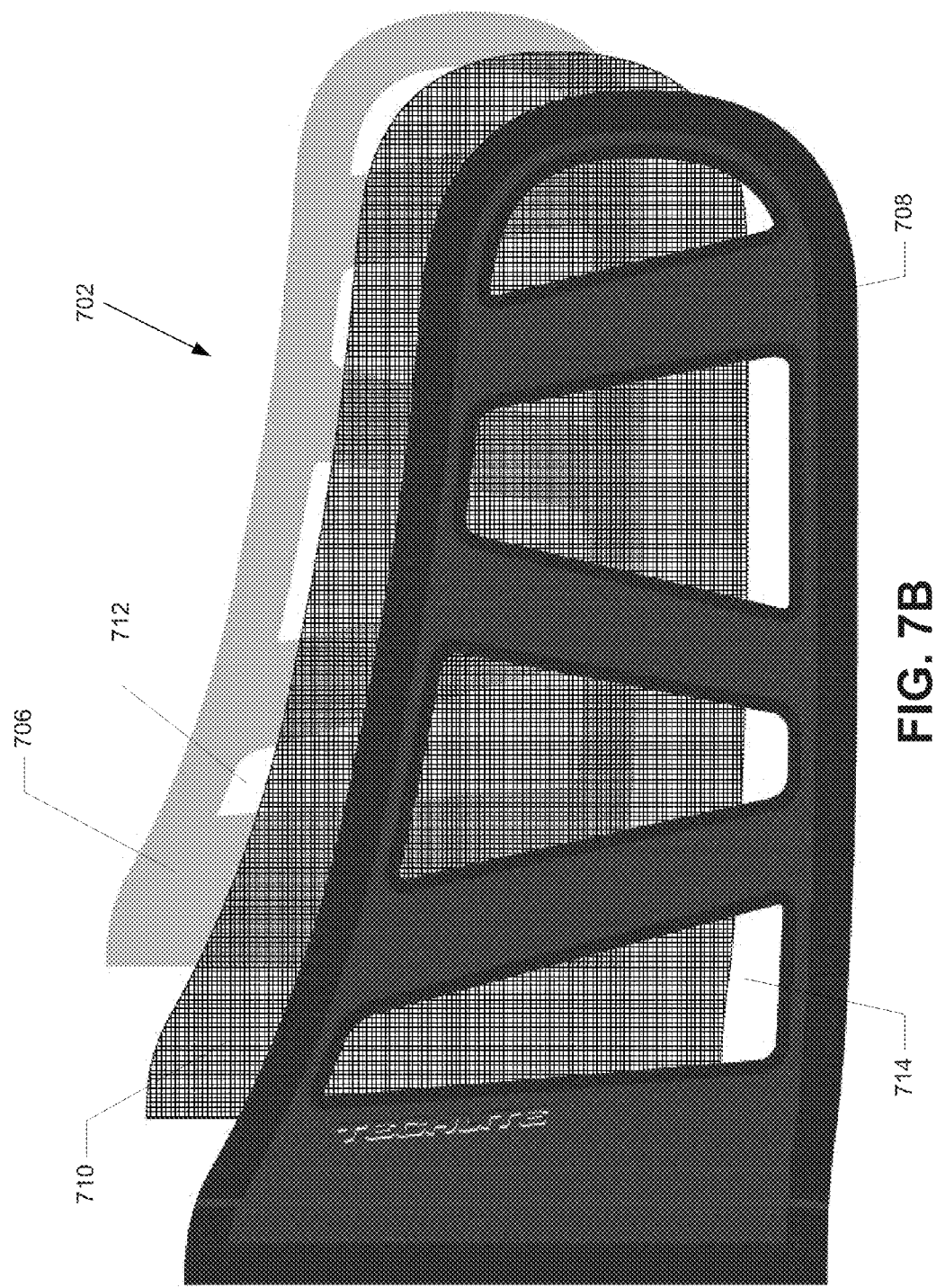
Figure 7C:
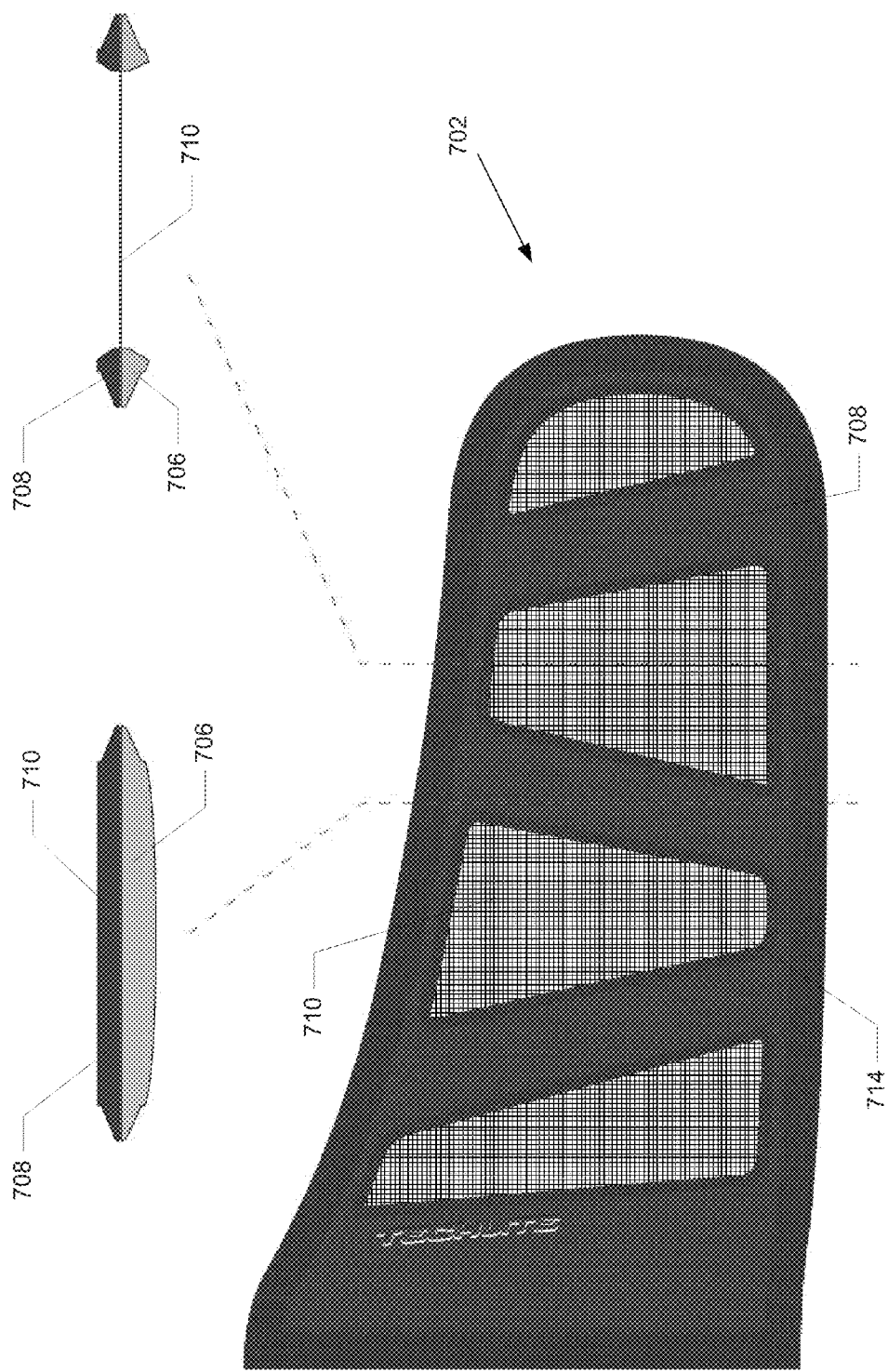

FIGS. 6A-6C illustrate a shoulder strap 602 for a duffle bag, messenger bag, or other utility pack, in accordance with various embodiments. Shoulder strap 602 includes an inner structural layer 606, an outer structural layer 608, and a reinforcing layer 610 disposed between inner structural layer 606 and outer structural layer 608. When in use, the inner structural layer 606 may rest on the shoulder of the user, and the outer structural layer 608 may face outwardly.

Inner structural layer 606 includes a plurality of openings 612, and outer structural layer 608 includes a plurality of openings 614 for breathability. The openings 612 of inner structural layer 606 are substantially aligned (i.e., overlapping) with the openings 614 of outer structural layer 608 to facilitate the transfer of air, moisture, vapor, and/or heat through the openings 612 and 614.

The inner structural layer 606 and outer structural layer 608 are made from a moldable foam, such as EVA. The reinforcing layer 610 is made of continuous mesh, such as nylon mesh, and covers the openings 612 and 614 of the inner structural layer 606 and outer structural layer 608, respectively. In other embodiments, the reinforcing layer 610 may not cover the openings 612 and 614.

In some embodiments, inner structural layer 606 may have a hardness that is less than a hardness of outer structural layer 608. The lesser hardness of inner structural layer 606 may provide cushioning for the user, while the greater hardness of outer structural layer 608 may provide wear resistance/durability.

FIGS. 7A-7D show an embodiment of a waist strap 702 for a backpack or other utility pack, in accordance with various embodiments. Waist strap 702 includes an inner structural layer 706, an outer structural layer 708, and a reinforcing layer 710 disposed between inner structural layer 706 and outer structural layer 708. When in use, the inner structural layer 706 may face the body of the user (e.g., the hip and/or torso), and the outer structural layer 708 may face away from the user's body.

Inner structural layer 706 includes a plurality of openings 712, and outer structural layer 708 includes a plurality of openings 714 for breathability. The openings 712 of inner structural layer 706 are substantially aligned (i.e., overlapping) with the openings 714 of outer structural layer 708 to facilitate the transfer of air, moisture, vapor, and/or heat through the openings 712 and 714.

In some embodiments, inner structural layer 706 may have a hardness that is less than a hardness of outer structural layer 708. The lesser hardness of inner structural layer 706 may provide cushioning for the user, while the greater hardness of outer structural layer 708 may provide wear resistance/durability.

When in use, waist strap 702 may be coupled to a second waist strap 702 of a utility pack across the front of the user's body.

Figure 8:
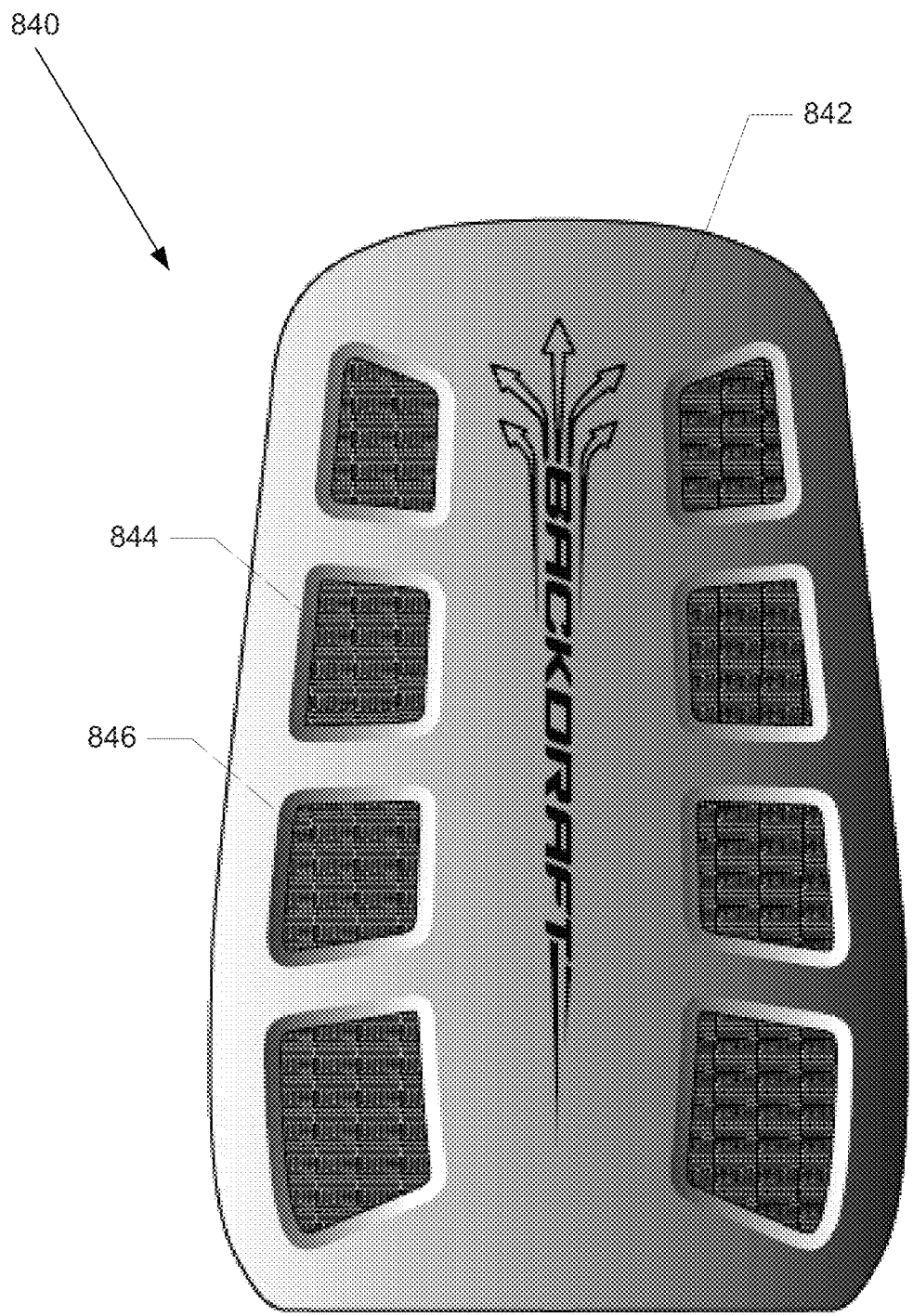
FIG. 8 illustrates a back panel of a backpack in accordance with various embodiments.

FIG. 8 illustrates a back panel 840 for a backpack, in accordance with various embodiments. Back panel 840 includes an inner structural layer 842 coupled to a reinforcing layer 844. The back panel 840 may also include an outer structural layer (not shown) coupled to the other side of reinforcing layer 844 from inner structural layer 842. Inner structural layer 842 may face the user's back when the backpack is worn. In some embodiments, the back panel 840 may not include an outer structural layer.

In some embodiments, inner structural layer 842 may have a hardness that is less than a hardness of outer structural layer. The lesser hardness of inner structural layer 842 may provide cushioning for the user, while the greater hardness of outer structural layer may increase the wear characteristics of the outer structural layer, provide structure/rigidity, and/or help distribute the load of the backpack over the back panel 840.

Inner structural layer 842 may include a plurality of openings 846 to facilitate breathability. Reinforcing layer 844 may cover the openings 846 and provide strength and stability to back panel 840 while also promoting breathability. The outer structural layer may also include a plurality of openings, and the openings of the outer structural layer may be substantially aligned with the openings 846 of the inner structural layer 842.

FIGS. 9A and 9B illustrate a backpack 904 having a pair of breathable straps 902 and a breathable back panel 950, in accordance with various embodiments. Back panel 950 includes a padding layer 952 coupled to a support layer 953. Support layer 953 may be rigid or flexible and may include a single material or different materials and/or layers. Padding layer 952 has four separate padding portions 954, 956, 958, and 960. In other embodiments, padding layer 952 may include any number of separate portions, such as about one to six portions. In some embodiments, padding layer 952 may include two padding portions. In embodiments with two padding portions, the portions may be oriented with one on each side of the back panel 950, or with one portion of padding on the upper portion of the back panel 950 and the second portion on the lower portion of the back panel 950. In embodiments, the padding layer 952 may be foam, such as EVA.

The portions 954, 956, 958, and 960 of padding layer 952 each include a plurality of ridges 962. Ridges 962 include a top portion 964 configured to contact the back of the user, and a bottom portion 966 configured to be recessed from the back of the user. The bottom portion 966 of the ridges may allow air, moisture, vapor, and/or heat to flow between the back panel 950 and the back of the user. Accordingly, the padding layer 952 provides support for the utility pack on the back of the user, while also allowing for breathability.

As shown, ridges 962 are oriented diagonally upwards as they move from the middle of the back panel 940 toward the edges. This orientation may promote the transfer of hot air 968 away from the body and the transfer of cool air 970 toward the body. Additionally, the portions 954, 956, 958, and/or 960 of padding layer 952 extend from support layer 953, forming a recessed portion 972 that is recessed compared with padding layer 952. Recessed portion 972 may provide a channel for air flow between the back panel 950 and the user's back. Padded portions 954, 956, 958 and/or 960 may be arranged in areas where the back panel 950 typically contacts the user's back, such as the shoulder blade region and/or the lower back, in order to provide cushioning and ventilation/breathability where it is needed.

In some embodiments, the features of back panel 950, such as ridges 962 may be combined with the features of the straps and/or panels described above, such as the comolded multi-layer configuration and/or the openings for ventilation. For example, the straps described above may include ridges or other features to provide air flow between the user's body and the straps. Similarly, embodiments of the back panel may be comolded multi-layer structures and/or include one or more openings. In some embodiments of the back panel including an inner structural layer, reinforcing layer, and/or outer structural layer, the padding layer 952 of FIGS. 9A-B may be equivalent to the inner structural layer.

In the foregoing embodiments, one of skill in the art will appreciate that, although only one or two different structural layers are illustrated, any number of structural layers may be used, for instance 3, 4, 5, 6, or more structural layers. Such different structural layers may be arranged in a number of strategic configurations. Additionally, the individual structural layers may include regions having different response properties within the structural layer. For example, a low density or durometer material may be used wherever extra softness or cushioning is needed, such as directly over the shoulder bones or in areas receiving extra pressure or friction, or for use when the user has an injury or otherwise requires more cushioning. In another example, a higher density or durometer material may be included in any area requiring firm support, extra stability, better load distribution, or extra durability. In other embodiments, the size and/or shape of the openings may be adapted to suit the needs of a particular activity or environmental condition. In some embodiments, the specific configuration of the structural layers and openings may be customized to suit the needs of an individual user.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of embodiments herein. Those with skill in the art will readily appreciate that embodiments herein may be implemented in a very wide variety of ways. This application is intended to cover any adaptations or variations of the embodiments discussed herein. Therefore, it is manifestly intended that embodiments herein be limited only by the claims and the equivalents thereof.

The invention claimed is:

1. A multi-layer structure comprising:
a reinforcing layer having a first side and a second side, the first side opposite the second side;
an inner structural layer coupled to the first side of the reinforcing layer, the inner structural layer configured to rest on a body of a user when the multi-layer structure is in use to provide cushioning to the user, and the inner structural layer including a body with one or more openings; and
an outer structural layer coupled to the second side of the reinforcing layer, the outer structural layer including a body with one or more openings;
wherein the inner structural layer, outer structural layer, and reinforcing layer are comolded together to form a unitary piece, the reinforcing layer providing tensile strength to the multi-layer structure, and the inner structural layer having a hardness that is less than a hardness of the outer structural layer.

2. The multi-layer structure of claim 1, wherein the openings of the inner structural layer are substantially aligned with the openings of the outer structural layer.

3. The multi-layer structure of claim 1, wherein the reinforcing layer substantially covers the openings in the inner structural layer and/or the outer structural layer, the reinforcing layer configured to allow air to pass through the openings of the inner structural layer and/or outer structural layer.

4. The multi-layer structure of claim 1, wherein the reinforcing layer is not disposed in the openings of the inner structural layer and/or the outer structural layer.

5. The multi-layer structure of claim 1, wherein the inner structural layer includes a first region and a second region, the first region having a hardness that is different than a hardness of the second region.

6. The multi-layer structure of claim 1, wherein the inner and outer structural layers comprise ethylene vinyl acetate foam.

7. The multi-layer structure of claim 1, wherein a thickness of the inner structural layer is greater at a middle portion of the inner structural layer than at an end portion of the inner structural layer.

8. The multi-layer structure of claim 1, wherein the reinforcing layer is continuous.

9. The multi-layer structure of claim 1, wherein the reinforcing layer is a mesh.

10. The multi-layer structure of claim 9, wherein the mesh is formed with a plurality of monofilament elements.

11. The multi-layer structure of claim 1, wherein the multi-layer structure comprises a utility pack strap for carrying a utility pack.

12. The multi-layer structure of claim 1, wherein the multi-layer structure comprises a panel for a utility pack, the panel configured to contact the body of the user when the utility pack is in use.

13. A method of manufacturing a multi-layer structure comprising:

providing an inner structural layer configured to rest on a body of a user when the multi-layer structure is in use, the inner structural layer including a body with one or more openings;

providing an outer structural layer including a body with one or more openings;

providing a reinforcing layer having a first side and a second side;

comolding the inner structural layer, the outer structural layer, and the reinforcing layer to form a unitary piece, the inner structural layer coupled to the first side of the reinforcing layer and the outer structural layer coupled to the second side of the reinforcing layer, and the inner structural layer having a hardness that is less than the hardness of the outer structural layer, wherein the openings of the inner structural layer are substantially aligned with the openings of the outer structural layer.

14. The method of claim 13 wherein the reinforcing layer and at least one of the inner structural layer and the outer structural layer are pre-cut prior to the comolding.

15. The method of claim 13, wherein the reinforcing layer is continuous.

16. A multi-layer structure comprising:

a reinforcing layer having a first side and a second side, the first side opposite the second side;

an inner structural layer coupled to the first side of the reinforcing layer, the inner structural layer having a body with one or more openings and configured to rest on a body of a user when the multi-layer structure is in use, the inner structural layer having a first hardness to provide cushioning to the user; and an outer structural layer coupled to the second side of the reinforcing layer, the outer structural layer having a body with one or more openings and having a second hardness, the second hardness being greater than the first hardness;

wherein the reinforcing layer includes a mesh formed with a plurality of monofilament elements substantially covering the openings in the inner structural layer and outer structural layer and is configured to allow air to pass through the openings of the inner structural layer and outer structural layer.

17. The multi-layer structure of claim 16, wherein a thickness of the inner structural layer is greater at a middle portion of the inner structural layer than at an end portion of the inner structural layer.

18. The multi-layer structure of claim 16, wherein the inner structural layer includes a first region and a second region, the first region having a hardness that is different than a hardness of the second region.

* * * * *